(12) United States Patent
Brunsell et al.

(10) Patent No.: US 8,114,004 B2
(45) Date of Patent: Feb. 14, 2012

(54) METHOD AND DEVICE FOR EVAPORATE/REVERSE OSMOSIS CONCENTRATE AND OTHER LIQUID SOLIDIFICATION

(76) Inventors: Dennis A. Brunsell, Knoxville, TN (US); Larry E. Beets, Knoxville, TN (US)

( * ) Notice: Subject to any disclaimer, the term of this patent is extended or adjusted under 35 U.S.C. 154(b) by 703 days.

(21) Appl. No.: 11/648,819

(22) Filed: Dec. 30, 2006

(65) Prior Publication Data

US 2010/0069700 A1    Mar. 18, 2010

(51) Int. Cl.
*B09B 3/00* (2006.01)
(52) U.S. Cl. ........................................ 588/255; 588/252
(58) Field of Classification Search ................... 588/252, 588/255
See application file for complete search history.

(56) References Cited

U.S. PATENT DOCUMENTS

| 4,382,026 A | 5/1983 | Drake et al. |
| 4,622,175 A | 11/1986 | Tamata et al. |
| 4,629,587 A | 12/1986 | Monden et al. |
| 4,702,862 A | 10/1987 | Ledebrink |
| 5,098,612 A | 3/1992 | Rowsell |
| 5,164,123 A | 11/1992 | Goudy, Jr. |
| 5,304,707 A | 4/1994 | Blankenship et al. |
| 5,318,730 A | 6/1994 | Rieser et al. |
| 5,462,785 A | 10/1995 | Holland |
| 5,481,064 A | 1/1996 | Kato et al. |
| 5,662,801 A | 9/1997 | Holland |
| 5,844,008 A | 12/1998 | McMillan |
| 5,908,558 A | 6/1999 | Holland |
| 5,916,122 A | 6/1999 | McClure et al. |
| 6,030,549 A | 2/2000 | Kalb et al. |
| 2002/0185156 A1 | 12/2002 | Tanhehco |
| 2004/0144682 A1 | 7/2004 | Altmayer |

*Primary Examiner* — Edward M Johnson
(74) *Attorney, Agent, or Firm* — Monroe Alex Brown, Patent Attorney

(57) ABSTRACT

A Method and Device for solidification of waste liquids and fluids is disclosed, which is particularly well suited to processing radioactive waste fluids. Set forth is a receiving unit or subassembly for housing solidification agent, and one or more manifold units or subassemblies positioned within the receiving unit for providing waste fluid. The subassemblies operate in relation to each other to provide, position and mix solidification agent or polymer with waste fluid so that a dirt-like polymerized waste product is produced and positioned in the container for removal or later safe shipment or storage. Mathematical relationships, in preferred embodiments or aspects are utilized in determining number and sizing of manifold openings, and pressure of waste to be provided, to meet the requirements of waste fluids to be transported through these openings into the receiving unit.

39 Claims, 24 Drawing Sheets

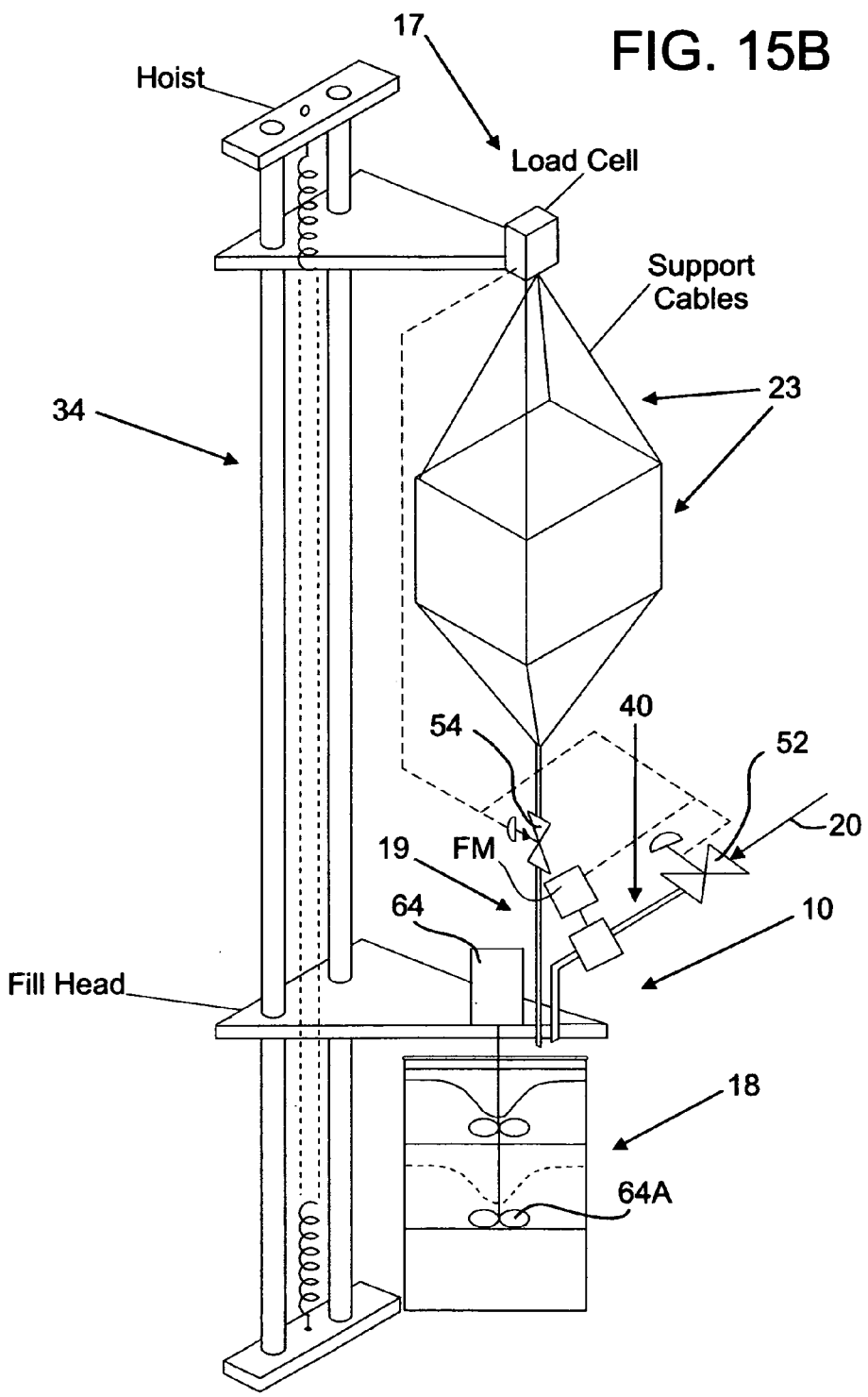

C.S. Polymer Chute

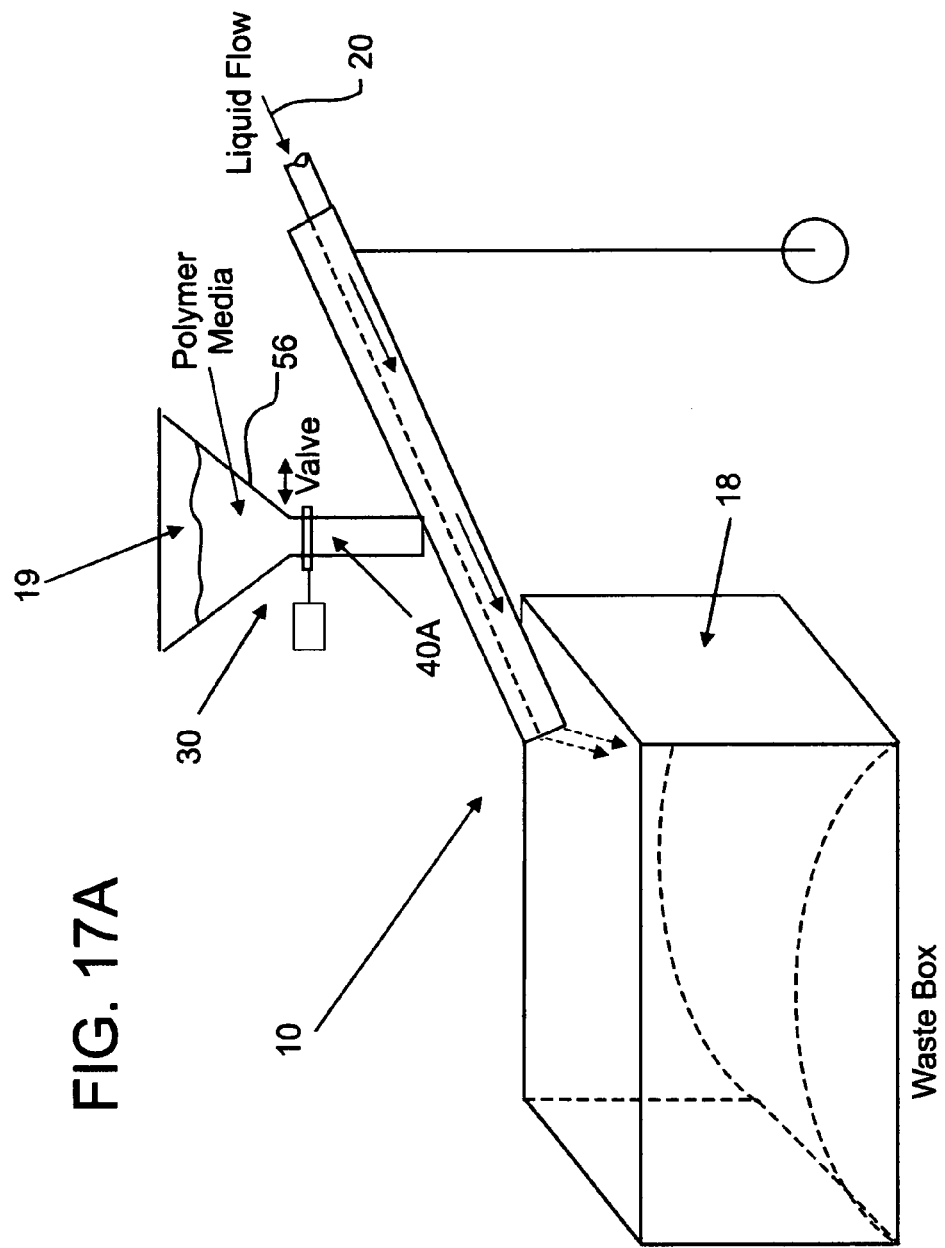

FIG. 17D
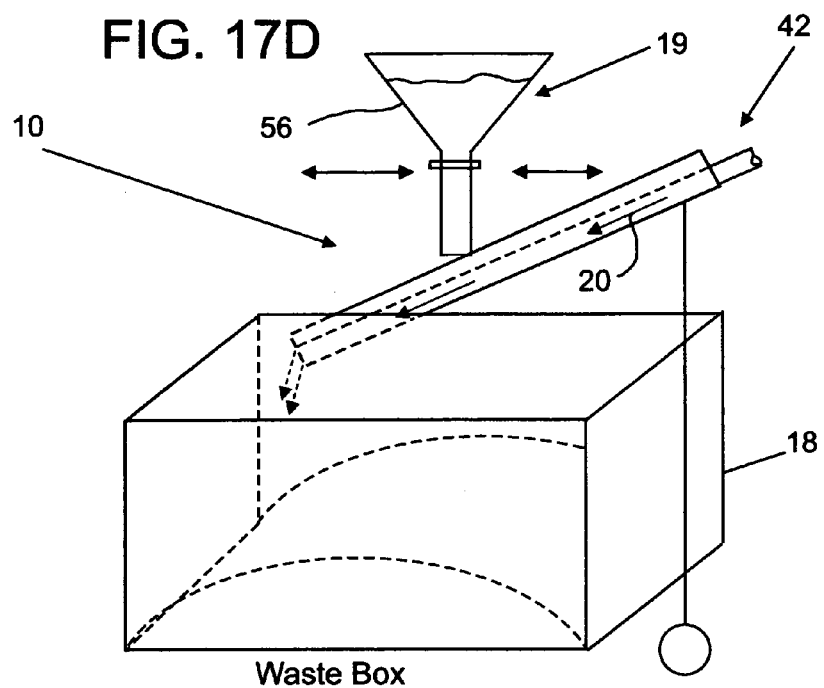
Waste Box
FIG. 17E  FIG. 17F  FIG. 17G
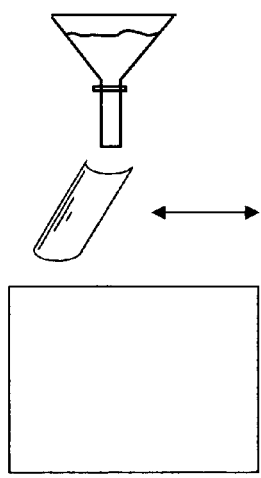 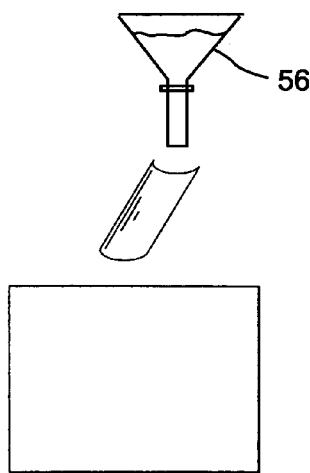 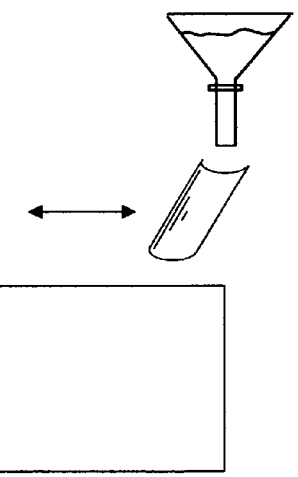

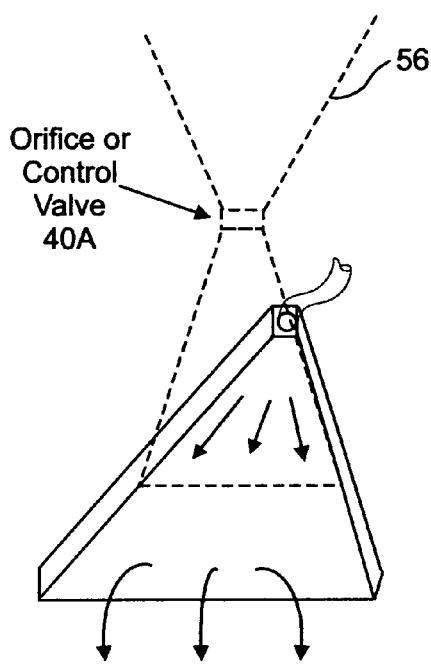
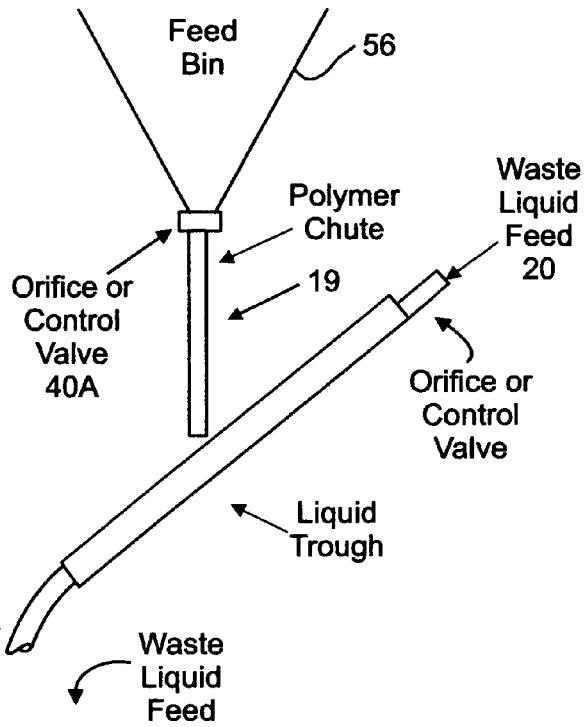
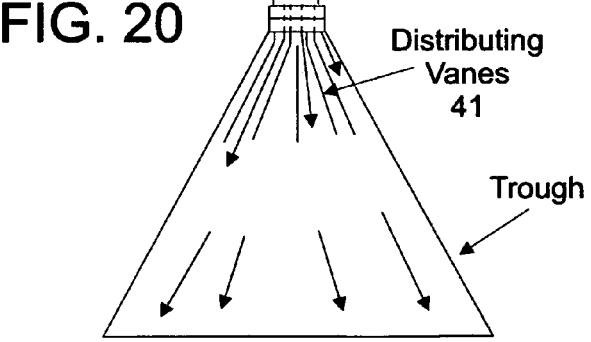
FIG. 18
FIG. 19
FIG. 20

CS Triangular Waste Trough

CS Triangular Polymer Chute

CS Rhomboidal Polymer Chute

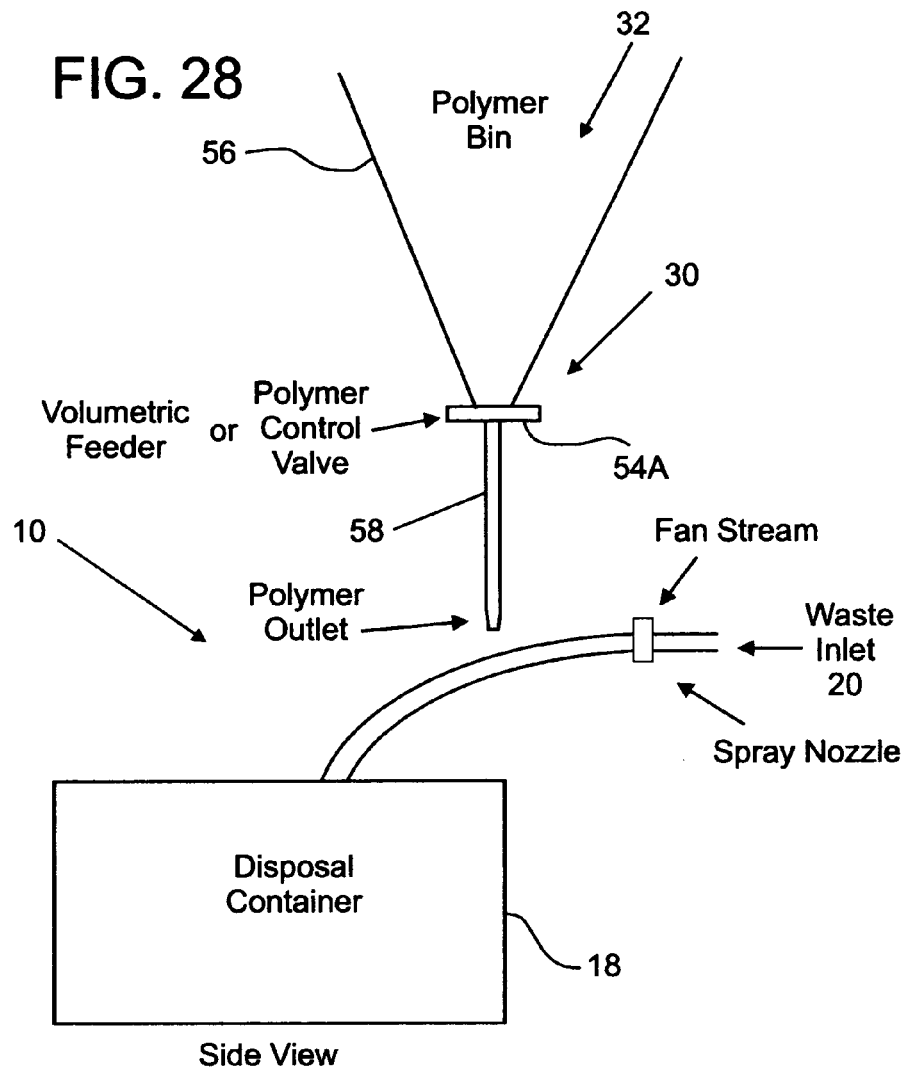
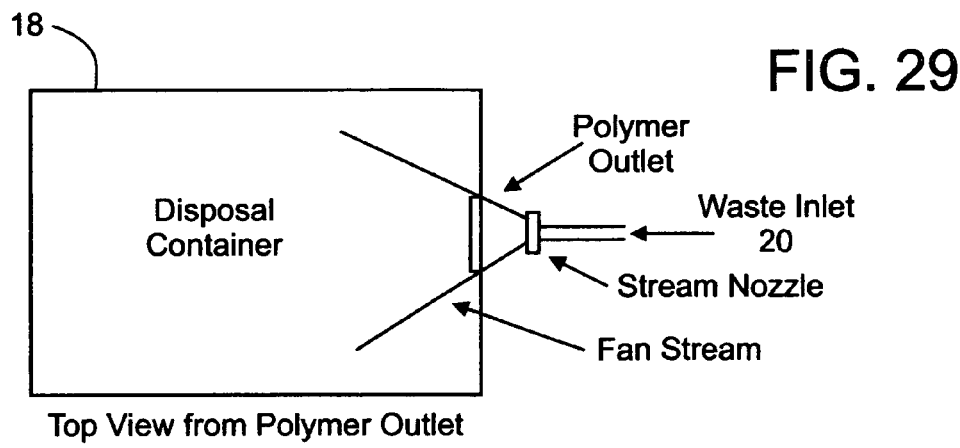

METHOD AND DEVICE FOR EVAPORATE/REVERSE OSMOSIS CONCENTRATE AND OTHER LIQUID SOLIDIFICATION

BACKGROUND OF THE INVENTION

1. Field of the Invention

The present invention relates to a device and method for using a liquid sequestering solidification agent provided to and arranged in a container to convert liquid or fluid based streams provided through a manifold system to the container, into a dirt-like, solid waste form which meets waste acceptance criteria (WAC) for burial at radioactive and other burial facilities.

2. Background Information

Radwaste water in the commercial nuclear power industry is frequently evaporated or processed through a reverse osmosis system (RO) to reduce the volume of the waste fluid being generated and handled. During the evaporation/RO process, the radwaste water will typically be concentrated until the water becomes saturated with one or more constituents or substances found in the water. After the radwaste water is concentrated, the concentrated liquids still need to undergo additional processing to make them ready for disposal.

In the past, evaporate/RO concentrates have usually been dried to dry solid for disposal. This drying process normally took place at the actual nuclear power plant, or off-site at a radioactive waste processing facility. The equipment used for drying is often bulky, difficult to shield for radiological dose, and challenging to mobilize and demobilize. Also; the operating, maintenance and upkeep on this equipment has usually been extremely costly. This is due to the fact that the drying process is very energy and radioactive dose intensive; and the liquids utilized are corrosive and fouling to such equipment.

Patent references in the past prior art appear to set forth inventions including:

1. Kath et al., U.S. Pat. No. 6,030,549, showing a process of encapsulating depleted uranium and forming a homogeneous mixture of depleted uranium and molten thermoplastic polymer;
2. McClure et al., U.S. Pat. No. 5,916,122 showing a method of solidifying specified aqueous wastes by exposing them in measured amounts to neutralized, cross-linked polyacrylate; being limited to landfill leachates, latex water, storm water, aqueous solutions of glues, and adhesives;
3. McMillan, U.S. Pat. No. 5,344,003 a process for reacting and converting municipal solid waste into a polymer filled product. The process includes the steps of reducing particle size of municipal solid waste and physically removing metals. This process, however, addresses municipal waste solidification using isocyanate or polyurethanes;
4. Kate et al, U.S. Pat. No. 5,431,084, showing a process utilized for solidification of antifreeze waste fluids; but utilizing a primary mixture of an iron adsorption agent with the waste fluid, followed by a water-absorbing acrylic polymer;
5. Holland, U.S. Pat. No. 5,462,785, showing a multi-chambered pillow with a polymer material in the chambers to absorb and solidify liquid hydrocarbons.
6. Rieser, U.S. Pat. No. 5,318,730, showing a process for forming a flexible and impermeable coating over hazardous materials with a thixotropic agent;
7. Tamata et al., U.S. Pat. No. 4,622,175, showing a process for solidifying radioactive waste, where an alkali silicate composition and curing agent is added to a container already containing radioactive waste which has been loaded first with no particular process, device or positional arrangement, for solidification;
8. Blankenship et al., U.S. Pat. No. 5,304,707, shows a method for incapulation of compositions having a continuous aqueous phase having steps of adding core-shell polymer particles into the composition, and then neutralizing the polymer particles, by using an organic or inorganic base so as to swell the polymer particles and absorb substantially all of the aqueous phase.
9. Goudy, Jr., U.S. Pat. No. 5,164,123, shows a process involving admixture of a toxic material with a thermoplastic polymer for the purpose of only coating the material;
10. Ledebrink, U.S. Pat. No. 4,702,862, shows another process involving the use of a thermoplastic polymer, such as radioactive polyvinylchloride, to merely encapsulate solid radioactive or toxic waste;
11. Drake et al., U.S. Pat. No. 4,382,026, shows a process for encapsulating radioactive organic liquids, utilizing dispersion in an unsaturated polyester or vinyl ester resin, curable to a solid;
12. Monden et al., U.S. Pat. No. 4,629,587, shows a solidifying disposal device for filling a thin-walled container of an inorganic material with radioactive waste, and the addition of solidifier. This device appears to teach structural elements including: a table, a filling cap above the table, lifting and lowering mechanism for movement between the table and filling cap until a lower peripheral edge of the filling cap is contacted by an upper peripheral edge of the container utilized; a supply mechanism, substantially different for that used in the present invention, for providing radioactive waste and a solidifier in a specified step process to the filling cap in a specified positional relationship, and a capping member for positional installation on the device's container.
13. Altmayer, U.S. Application 2004/0144682, shows a waste material solidification pouch, where a pre-measured liquid soluble pouch is combined with a pre-measured volume of absorbent crystalline form polymer like sodium or potassium polyacrylate, sealed and contained within the pouch. This is said to allow a known volume of liquid waste material to be solidified by the inclusion of a known number of these pouches into the waste; without the user having to directly place the bulk absorbent solidifying agent into such waste.
14. Tanhehco, U.S. Application 2002/0185156, shows a solidifier device and method of solidification which is designed to utilize two absorbents, each having a different density relative to the waste to be solidified. There appears to be no means of delivering waste to an already existing container housing a uniform polymer absorbent, and no manifold means for delivering waste fluid to different positions within the container; nor for doing this at a preselected ideal pressure and flow rate.
15. Holland, U.S. Pat. No. 5,462,785, shows a liquid hydrocarbon sorbing and solidifying pillow. The absorbed waste material is solidified within the pillow into a rubber-like mass. The device is provided with a number of layered, internal textile-formed chambers secured by quilted seams which divide the pillow into two columns of stratified pockets; with absorbing polymer inside each chamber. This reference indicates that it seam also creates consolidation points acting as flow channels for migration or entry of a spill or leak.

All of the prior art references found indicate distinctions in relation to the present invention. None of the references teach show or provide for: merging and bonding of solidification agent and waste fluid into a safe solidification product have a dirt-like consistency; where the waste is conveyed into a container already having a preselected level of a solidification agent by means of a manifold system.

In this regard the prior art does not show the introduction of waste material through a manifold system in the container which is stationary or pivotable or positionable within the container; i.e., from position-to-position or level-to-level within the container or receiving unit, already containing a preselected level or volume of absorbing polymer within a non-chambered container.

Additionally, none of the prior art references provide for control of waste fluid flow rate and pressure at the openings (apertures) of a manifold subassembly or system, as shown in the present invention.

Accordingly, the prior art references show no ability to evenly spread and solidify waste from level to level (layer to layer) of one or more pre-positioned layers or levels of solidification agent (polymer); or the ability to work with changing levels of absorbing polymer as waste fluid enters the container proximate to such polymer levels.

Additionally, part of the many disadvantages of the prior art methods and devices include the fact that handling and transporting radioactive solids after conventional evaporation and drying can be extremely complicated and costly. En this regard, since the drying processes increases the concentration of radioactive materials, it often requires that the shipment of radioactive material to a burial site; utilize highly specialized, shielded casks to protect the general public, under Federal regulation guidelines, from radiation exposure.

Also, the resulting higher radioactive waste classification, in this regard, further limits the potential burial sites available to, essentially, one such site in the country, at the time of filing for this Patent. Further complications exist because of the potential in the future of an available burial site, to place further volume and waste classification limits on many of the commercial nuclear plants and radwaste generators transporting radioactive material. If this does become the case, plants and sites disseminating radioactive materials might we be required to store radioactive waste material on or near their own location.

However, the greatest dilemma, involving the conventional drying process, involves the cost, itself. The cost of performing final evaporation and drying of large quantities of concentrate is extremely expensive. This is especially true, when one considers all of the operating and maintenance costs associated with such a process. Both the high salt concentrations and organic constituents hamper efficiency rates and pose difficulties in material-handling. Therefore, corrosion and fouling from the salts and organics, constituting a part of the conventional process, drive up maintenance or upkeep costs.

Another important concern in the conventional process is the exposure of personnel to radioactivity. In this regard, just as the concentration of the salts and constituents increases during the evaporation and drying process, so does the concentration of the radioactive species. This leads to higher radioactive activities; which, in turn, results in higher exposures of radioactive dose to personnel in the area of use.

Another major complication of the evaporation/drying process is that the evaporate/RO concentrates can become contaminated with organic constituents which prevent the drying of concentrates to a condition and solid state required by burial sites for disposal. In this case, special remediation techniques are required. These remedies increase disposal costs and subject personnel to exposure of radiation.

The option of repackaging radioactive material as shown in the prior art, in suitable burial containers also entails similar problems.

Also; water, semi-fluid or other similar waste forms produced under prior art devices and methods, frequently require double containment when being shipped to a waste processing facility. This poses very high risk for waste generators. Transportation accidents have also occurred during such shipments. This has generated great public concern. It has also led to very high costs when it has been necessary to correct the effects and dangers of such accidents.

Therefore, a more simple process and device to carry out such a process providing for lower operation cost, simplicity of maintenance and better protection from radiation exposure; would be highly advantageous to the nuclear industry.

Also, the evaporate concentrates and/or reverse osmosis (RO) concentrates used in the prior art methods and devices frequently expose personnel to hazardous radioactive dose rates; and require that substantial radiation protective means be in place to limit such exposure. Therefore, any process, or device for carrying out such a process, which minimized exposure through time, distance and shielding would substantially increase worker safety and benefit the entire industry.

It is, therefore, an object of the present invention to provide a device and process which utilizes liquid sequestering agents; i.e., a solidification agent, polymer, or media; to convert liquid based streams or more solid fluids into a dirt-like, solid waste form which meets waste acceptance criteria (WAC) for burial at all radioactive burial facilities.

It is also an object of the present invention to provide a device and method for using a liquid sequestering solidification agent provided to and arranged in a container to convert liquid or fluid based streams provided through a manifold system to the container, into a dirt-like, solid waste form which meets waste acceptance criteria (WAC) for burial at radioactive and other burial facilities.

It is also in object in this regard to provide a device and associated method where a solidification agent such as a polymer is added to and/or arranged within a container where admixtures can be added for solidification, and a fluid waste or waste stream is provided to or introduced within the container at a preselected level within the container by a manifold system or subassembly having specially designed holes, for production of a dirt-like solid within the container.

In this same regard, it is a further object of the present invention, as an additional embodiment thereof, to utilize the contour, configuration or shape within the container for advantageous mixture of solidifying agent and fluid waste stream at the desired level within such a container.

It is another object to provide a solidification process and device for carrying out this process, through its related included embodiments and aspects, which simplifies prior art processes, increases efficiency and improves radiation protection.

In this regard, advantages over the prior art include, without limitation, the following aspects:

The device and process of the present invention does not utilize heat. Therefore, direct energy costs are eliminated. Also, support utilities such as service air, service water, and so forth, are minimal. Indirect utility costs are, therefore, essentially, also eliminated.

Most of the equipment and materials utilized in the solidification device and process of the present invention are disposable or low cost items. This reduces or minimizes maintenance costs. Therefore, the required initial capital investment or costs are minimal.

In a related aspect, the process and device of the invention utilize technology which minimizes maintenance down-time and costs. It also enables it to run relatively trouble-free. This limits the time spent in physical contact with the device and process; and reduces exposure of work-personnel to radiation.

The mixing of waste and solidification media in the present invention can be mediated through remote mechanical and/or computer assisted controls. Such controls can facilitate original or initial placement of one or more manifold subassemblies, and can, during the process, reposition one or more of such manifold units. This further limits contact and exposure of personnel.

While dose rates for concentrates being processed varies from 1 to 1,000 mRem, the compact nature of the device of the invention allow it to be shielded more efficiently. This also facilitates lower personnel-exposures.

Drying complications are avoided. This precludes the presence of materials or mixtures in a semi-fluid (or peanut-butter-like) consistency, which would render such materials unsuitable for burial and require additional costs to remedy.

The waste form resulting from use of the device and process of the present invention is more likely to remain in one of the lower waste classifications. This improves the ease and efficiency of transportation and disposal. Also, retaining such material in a lower waste classification provides more options as to disposal in terms of available disposal or burial sites.

These options and others of the invention manifest the capability of producing a dirt-like product in situ, or on the site of burial. The resulting dirt-like product from the device and process of the invention can be mixed with other waste materials in large open trenches, or other convenient places. This will minimize the burial costs by maximizing the burial options and degree of efficiency involved. Additionally, the dirt-like product of the present invention will be readily transferable or flowable in nature. This will provide additional options in its use as a filler material in waste containers. Such options will better utilize burial volume, and decrease burial costs.

Therefore the waste product resulting from the device and process of the invention will be subject to easier shipment. Less expensive shipping containers will be needed. Also, because of the nature of the invention's waste product, such shipping containers would be recyclable.

Importantly, though various types of water solidification processes, and associated devices, in the prior art appear to have used similar polymer media; such structures and processes have utilized only rudimentary mixing methods. These mixing methods have included, among others, simply dumping solidification media into a waste liquid or throwing pillows or packets into a waste spill or container. Other crude mixing techniques have been used, such as the employment of a shovel or paddle to attempt to provide for distribution of the media into the waste material being treated.

Additionally, the prior art devices and processes involve use under exposed conditions. This exposes work personnel to radiation dangers because of the inherent human contact involved in such operations. Therefore, in these situations, such mixing can only be done with liquids having low gamma activity. In such mixing environments, efficient media utilization does not occur because of poor waste distribution and loading. Therefore, the ability to meet the burial waste acceptance criteria is unreliable, unless the waste container is heavily dosed (over-dosed) with solidification agent. The present invention, therefore, solves a significant problem in this regard, in the prior art. Also, as discussed in part above, the solidification of evaporator and RO concentrates in these processes; present a great challenge to work with in that they have much higher ionic concentrations. The reactivity of the solidification agent is slowed down and requires higher amounts of media to bring about the same degree of solidification. Also, as discussed, due to the elevated radiation dose rates that are normally associated with evaporator and RO concentrates, direct contact by personnel necessitated by crude mixing techniques cannot be reasonably accomplished.

Evaporate concentrates also have the unique problem in the prior art of generating higher temperatures, often in the range of bout 150 degrees to 210 degrees Fahrenheit. This causes very rapid solidification. Such chemical and physical states require very rapid and consistently even distribution of the media. The present invention resolves all of these problems in the art.

Therefore, the teachings of the present invention in terms of its solidification process, and related structure for carrying this out, were developed to overcome the problematic issues in the prior art of ionizing radiation exposure, process temperature effects, reaction rates, volume reduction efficiencies, the ability to evenly distribute and solidify waste fluid and solidification agent, direct/indirect costs (operational, maintenance, utilities, etc.), operational practicality, and the ability to handle waste/radioactive material. Improvements over the prior art also, therefore, include, among others, the improvement in containment-qualities of the liquid and vapor phases; and related prevention from radioactive contamination in findings, testing and qualifications inherent in such operations. The present invention also offers improvement of remote control applications. This permits safe remote operation and minimizes personnel exposure during solidification and container closure operations.

It will, therefore, be understood by those skilled in these technologies that substantial and distinguishable device, process and functional advantages are realized in the present invention over the prior art. It will also be appreciated that the present invention's efficiency, adaptability of operation, diverse utility, and distinguishable functional applications all serve as important bases for novelty of the present invention.

SUMMARY OF THE INVENTION

The foregoing and other objects of the invention can be achieved with the present invention's process, device and system. This system includes a device and associated method for solidification of waste fluid to a solidification product having a dirt-like consistency.

Part of the applicable aspects included within the scope of the invention pertain to preferred embodiments including mixing methods for aqueous waste applications. These method embodiments, and the correlating and associated device embodiments, are not limited to evaporator and RO concentrates; and address the environmental, radiological and chemical problems associated with remote solidification of fluids and slurries. These methods solve the problems normally involved in rapid solidification and viscosity preventing mixture. Additionally, applications involving organics that are highly reactive may be resolved. These methods involve the achievement of a homogeneous mixture of the media polymer and a liquid or fluid waste.

In one embodiment, this is achieved by the invention's novel manifold system which places and disseminates liquid waste into a receiving unit containing a selected polymer. A scale in some preferred embodiments is utilized to measure the weight of the liquid waste and polymer together. A flow meter totalizer and scales can be used, indicating a topping point when the receiving unit is full. Alternatively, a scale is utilized in measuring weight for fill control and shipping purposes. The receiving unit can be provided in forms varying in shape and size from drums, boxes, liners, cargo containers, roll-off dumps and others. An important aspect is the improved distribution of solidification agent through use of a slanted or angular configuration, and a trough-like structure, to better facilitate the mixing of the polymer and liquid waste.

In other aspects, preferred embodiments of the present invention utilize a specially sized and shaped receiving unit, container, reservoir, or vessel where the internals of the invention are designed to permit advanced loading of a known amount of polymer in a bottom portion of the unit. The liquid to be solidified is then added at a known rate, resulting in even distribution of the polymer employed throughout the mixture. Control of the feed rate is required to be in an approximate range to insure proper operation of the invention's internal manifold. The device structure employed provides a novel distribution manifold for properly distributing the liquid waste throughout a polymer supplied to, and dwelling in, the receiving unit. The manifold system is provided with selected hole sizing and spacing to facilitate and permit the generation of sufficient backpressure to assure even distribution of the liquid waste in the receiving unit.

The manifold is aligned vertically with a known amount of polymer above and below the internals. The size and shape of the internals, as affected by the configuration of the receiving unit, and the array or positioning of the manifold extensions or holes, assure successful and functional distribution. The invention requires no spreading or liquid or solids in this embodiment. The liquid is distributed into the solids, and allowed to grow or increase volume to fill the receiving unit.

Other embodiments of the invention's process and device are applicable or expandable to include multiple layers of distribution internals. Such layers may be produced or structured at the same time (concurrently), or can be made through separate fills at different times (consecutively).

The manifold embodiment (the distribution internals) of the invention's Method is suitable where solids are present, where the particle size of such solids does not exceed the size of the openings in the manifold system, or otherwise cause bridging or plugging of the distribution internals.

The device and associated method of the invention are designed to increase waste distribution and loading efficiencies and improve personnel and environmental safety for several reasons including reduction of exposure to ionizing radiation and providing better quality controls in meeting waste acceptance criteria for burial sites. All of these methods are improvements over the dump-and-mix-methods previously utilized for various liquid streams described in the prior art.

Exemplary embodiments, without limitation, as examples of the present invention's process and device for carrying out the process herein set forth a method and associated mechanism for remote introduction, immediate mixing and automatic distribution of a solidified waste material so as to produce a safe dirt-like end product having the advantages set forth in containment, packaging and transportation or shipment of such materials, and other advantages.

Other preferred forms of the invention's device and correlating method, as exemplary embodiments of the invention, are set forth; using mechanical mixing, and designed for applications where viscosity or solids content may prevent utilization of the other associated method/device embodiments. These method/devices are designed to increase waste distribution and loading efficiencies and improve personnel and environmental safety for several reasons including reduction of exposure to ionizing radiation and providing better quality controls in meeting waste acceptance criteria for burial sites. All of these methods are improvements over the dump-and-mix-methods previously utilized for various liquid streams described in the prior art.

BRIEF DESCRIPTION OF THE DRAWINGS

FIG. 15B is a side perspective view of another embodiment related to those of FIGS. 14 and 15A.

FIG. 17A is an exemplary side view of an embodiment of the invention related to that of FIGS. 1A and 16, showing directional aspects of the movement of the solidification agent and the waste processed in the present invention.

FIG. 17D is a further exemplary side view of the embodiment of FIG. 17A, showing directional aspects of the movement of the polymer and waste processed therein, and further positional aspects of the metered polymer supply assembly and the metered waste supply assembly in relation to the container of the invention.

FIGS. 17E, 17F and 17G are partial side views of the embodiments of FIGS. 1A, 16 and 17A, showing positional relationships between the polymer supply assembly, the waste supply assembly and the container of the present invention.

FIG. 18 is a partial elevated perspective view of the novel trough and waste trough of the present invention, as it pertains to embodiments related to those of FIGS. 1A, 16, and 17A through 17G.

FIG. 19 is a side view of the polymer supply assembly and the waste supply assembly of an embodiment related to those of FIGS. 1A, 16, 17A-17G and 18.

FIG. 20 is another partial elevated perspective view of the novel trough and waste trough of the present invention.

FIG. 28 is a side view of another embodiment of the present invention.

FIG. 29 is a partial top view of the embodiment of FIG. 28.

Figure 24:
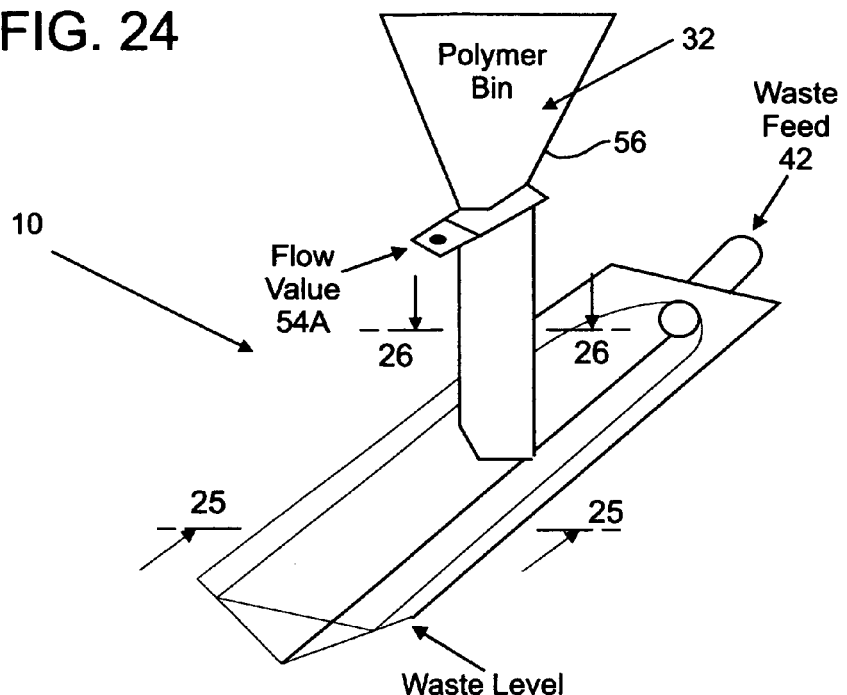
FIG. 24 is a side elevated perspective view of an embodiment of the metered polymer supply assembly and the metered waste supply assembly of the invention.
Figure 25:
FIG. 25 is an exemplary cross-sectional view of a portion of the metered waste supply assembly of FIG. 24, which relates to the alphabetical portion designations set forth in FIGS. 16A, 16C and 16D.
Figure 26:
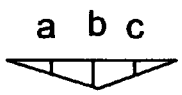
FIG. 26 is an exemplary cross-sectional view of a portion of the polymer chute set forth in FIG. 24, as a part of the metered polymer supply assembly, also showing the alphabetical portion designations set forth above.
Figure 27:
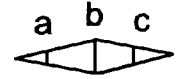
FIG. 27 is an exemplary cross-sectional view of a portion of a different embodiment of the polymer chute previously referenced in FIG. 26.

| REFERENCE NUMERALS | |
|---|---|
| 10 | Invention, Method and Device for Solidification Of Aqueous Or Fluid Waste |
| 17 | Scaling Assembly (scaling, weighing or volumetric means) |
| 18 | receiving unit, container, reservoir or vessel |
| 18P | Waste Product from Device or Method of Present Invention |
| 19 | Solidification agent or polymer including group consisting of poly(maleic anhydride), polyvinyl alcohol, poly(ethylene oxide), poly(hydroxymethylene), polyacrylamide, polyacrylate, starch-g-poly(acrylonitrile), ionic polysaccharides, and guar gum |
| 20 | Waste Fluid |
| 21 | Loss in weight feeder sub-system (or general Volumetric system) |
| 23 | Lifts (polymer/solidification media bin) |
| 24 | Hood |
| 25 | Exhaust assembly, means for removing gaseous matter from container (18) |
| 26 | Liner or disposal bag |
| 28 | HEPA vacuum exhaust subassembly |
| 29 | Camera port and camera or other monitoring device |
| 30 | Metered solidification agent or polymer supply assembly (polymer supply assembly) |
| 32 | Polymer supply area |
| 34 | Mixer-bin support subassembly |
| 40 | Metered waste trough supply assembly |
| 41 | Vanes |
| 42 | Waste supply area |
| 43 | Tabs |
| 44 | Pivot assembly of (40) |
| 45 | Mixing generator(s) (trough bottom surface variation or channels) |
| 40A | Orifice of chute_to the trough (40) (orifice or control valve of chute) |
| 47 | Gelation (exemplary or representative illustration) |
| 50 | Waste product or solidified, or polymerized waste resulting from Method or Device of the Invention (generally or representatively illustrated) |
| 52 | Waste flow control valve (or waste metering valve) |
| 54 | Polymer flow control valve (or polymer metering valve) |
| 56 | Catching and flow directing subassembly of (30) (or funnel or conical member, comprising chute in this embodiment) |
| 58 | Polymer chute |
| 54A | Metering flow valve (in embodiment shown in FIGS. 24 AND 28) |
| 60 | Polymer nozzle of (30) |
| 62 | Waste nozzle of (40) |
| 64 | Mixer unit(s) (mixer elements/subassemblies/members employed in eferenced preferred embodiments) |
| 64A | Propeller of (64) |
| 70 | Distribution Manifold subassembly or system |
| 70A | Additional or further distribution manifold subassembly or system |
| 72 | Central conduit of (70) |
| 74 | Arm member of (70) |
| 76 | Openings of (74) |
| 78 | Support member for (74) (in another embodiment of the invention herein) |
| 80 | Final Waste [Polymer] Fill Line |
| 82 | Additional Polymer - further fill line |
| 84 | Polymer Fill Line - Initial or preselected first level |
| 86 | First position of the manifold |
| 88 | Second or further position of the manifold |
| 90 | Protective member |

DETAILED DESCRIPTION OF THE PREFERRED EMBODIMENTS OF THE INVENTION

The following description of the preferred embodiments of the concepts and teachings of the present invention is made in reference to the accompanying drawing figures which constitute illustrated examples of the device-teachings, method-teachings, and structural and functional elements of the present invention, among many other examples existing within the teachings of the invention and the scope and spirit thereof.

Terminology

As utilized herein, except when otherwise indicated, the following words, terms or like wording; are generally, or substantially, ascribed as to definition or meaning as set forth below; without limitation as to other conventions, when appropriate, known to those skilled in the art:

1. Solidification media or media: material that has a high affinity for water or other liquid, and binds water or other liquid chemically to form a solid, dirt-like or gelatin-like material. These materials are usually comprised of superabsorbents (superabsorbents) made up of flexible polymer chains; and carry dissociated, ionic functional groups of non-soluble molecules.

2. Fine screen material, fine screen like material: metallic or non-metallic, cloth-like material of a size capable of preventing passage of the solidification media.

3. Tissue paper or plastic: fine pored material capable of preventing passage of media; while providing passage of water and other liquids.

4. Very fine openings, slotted pipe: any porous or slotted pipe or conduit materials capable of distributing liquid without reverse passage of water or other liquids.

5. Solidification agent: Including polyacrylate; but also including in addition to polyacrylate, as polymer choices in practicing the present invention, without limitation: poly(maleic anhydride), polyvinyl alcohol, polyethylene oxide), poly(hydroxymethylene), polyacrylamide, starch-g-poly(acrylonitrile), ionic polysaccharides, and guar gum.

6. Superabsorbent: a polymeric material that absorbs fluids and retains them better than conventional absorbents such as cotton, foams and sponges; while being relatively insoluble; where such a substance does not release the liquid absorbed unless significant pressure is applied.

7. Volumetric equipment:
   A. Loss-in-weight feeder: a method or augmenting device to feed a known weight of material into a process or stream by the use of load cells or other weighing mechanisms. The change in weight (loss) is measured per unit of time to determine the addition (or loss) rate.
   B. Volumetric rotary screw feeder: same as indicated just above, where a solids feeder utilizes a rotary screw to meter solids at a constant or variable known rate into a process or stream.
   C. Air transport infection: Same as noted above, where air is utilized to fluidize and transport a solid (in many cases) from one location to another.
   D. Orifice: Same as indicate, where an opening is used to control flow rate of liquids or solids.

8. Liquid volume control:
   A. Flow meter controlling flow control valve, flow meter (same): method of controlling liquid or solid flow by measuring the flow through a pipe or conduit and controlling that rate by varying the orifice in the conduit by opening or closing a valve.
   B. Orifice for flow control: normally an opening due to size that limits the flow of liquid or solids. This control is often proportional to pressure or head on the material.
   C. VFD controlled pump: variable frequency drive that controls the speed of rotation of a pump through variation in the frequency of oscillation of the current supplied to the motor in the case of AC motors.

9. Oscillating spreader: as utilized in the invention; not commercially available.

10. Linear activated spreader: a distribution device where the collection device is mounted on a linear actuator that permits even distribution of the liquid or polymer into the waste container.

11. Spreader: a specially designed device used to evenly distribute solidified material using a racking, plowing or other type of spreader.

12. Vibration/shaker: a device to generate one or two dimensional motions that result in settling and more even distribution of the solidified material.

13. HEPA vacuum exhaust: a high efficiency particulate filter, capable of removing 99.94% of the particulate in an air stream. In this regard:
   a. Integral condenser: a heat exchanger designed to condense saturated air so as to prevent condensation on the HEPA filters (or making them wet). These condensers would be located within the solidification container in the exhaust path so as to return the condensate directly to the solidification process.
   b. Exterior condenser: condenser to, as above described, but located outside the solidification container, but within the exhaust path so the condensate is diverted to an alternate container or returned to the same container.

14. Scale, weighing member: where these could be a number of commercially available scales or load cells mounted to a fabricated structure.

15. Bin and "transferable media bin": where these can be a standard metal, plastic, cloth or other material bin, usually with sloped bottom to assure complete discharge. Bin should be smooth walled, and may have vibrators or displacement mechanisms to aid in discharge. Bin/hoppers/bags are usually large enough to contain at least enough material to complete a single solidification.

16. "Bags": usually cloth, paper, composite, fiber or plastic material. Volume usually varies from a few cubic feet to tens or hundreds of cubic feet.
   a. "IP-1" rated: DOT (49 C.F.R. §§173.410 through 173.443) rating for hazardous and nuclear materials that meet certain retention and impact resistance.
   b. "IP-2" rated: DOT (49 C.F.R. §§173.410 through 173.443) rating, as above, but with higher standards and greater impact resistance.

17. "RCRA materials": materials regulated by 10 C.F.R. §129, as being hazardous to the environment, and that must be rendered non-hazardous or disposed in special disposal sites.

18. Fixed rate basis: applicable, without limitation, to the first method or method/device embodiment herein; referring to processing at a constant flow rate. The application of a fixed rate basis, as in the Method 1 embodiment involves the process streams (solidification polymer/agent and waste liquid/concentrate/slurry) being controlled on a fixed or predetermined rate by means of an orifice, valve, or other flow-/mass-rate control device being combined at a known rate as determined by process control procedure (PCP) testing to give the desired result.

19. "Variable rate basis": as to this method, and as further described herein, where the flow of polymer and liquid can be varied independently within the constraints of the equipment, while meeting the solidification requirements set forth.

20. "Liquid/solid mixtures", "sludges": the process can be utilized for pure liquids as well as liquids containing solids components. The solids content can very from less than one percent (1%) to greater than 50 percent (50%) solids. Sludges are usually considered mixtures where the solids content exceeds the liquid content in the mixture; whereas a slurry contains less than fifty percent (50%) solids and is more fluid.

21. "Multiple layers of distribution internals": a single layer of internals may be appropriate for many applications, but multiple layers of internals (distribution manifold subassemblies) may be used to either enhance the distribution or the quality of the solidification product. This involves placement at different levels; i.e., different levels from or in relation to the bottom of the receiving unit or container; and additional distribution internals. As indicated herein, these internals can be fed separately at different time intervals or in parallel.

22. Regarding the aqueous mixture embodiments of the invention utilized in the production of a polymerized waste dirt:

"Stream" Continuous flow of water without the formation of droplets.

"Flow straighteners": channels, fins or other parallel devices utilized in the present method to straighten or make flow more laminar and directional, to reduce turbulence and swirling effect in the water or aqueous fluid.

"Nozzle": directional device at the end of a conduit that directs liquid in a particular pattern.

"Chute": a gravity and directional channel for positioning a flow of flowable solids, liquid or fluid.

"Angle of impingement": the angle measured from the tangent of the stream flow in either free air or in relation to the chute.

"Polymerization": the process where liquid is bound chemically to an organic structure forming long chains (polymers)

"Hood": a structure made from materials, without limitation such as metal, plastic, fabric or other fabrication materials; used to contain gases and splashing liquids that may be hazardous to personnel and the environment.

"TDS": total dissolved solids contained in a liquid usually measured in ppm or mg./l.

"Turbulence": rapid mixing of a liquid or gas stream causing objects of solids to form in the stream or by friction in a boundary surface or identified space.

"Bonding strength": the ionic and covalent strength of various atomic bonds which hold various chemical components together.

"Continuous phase: the air or liquid phase being in unbroken contact with itself around other isolated phrases of a like or different phase which is considered to be discontinuous.

"PCP": a Process Control Procedure that permits small scale testing to be scaled to full-scale applications.

23. With regard to the manifold embodiments of the invention, the following terminology is applicable, without limitation (as set forth above):

"Manifold": a conduit for supplying fluid or liquid to a series of orifices for distribution within a containing volume of solidification agent.

"Spray/stream penetration": the ability of the liquid stream to extend into a solid granular matrix before velocity is negligible due to impingement.

"Reynolds Number": a mathematical relationship between fluid flow, frictional relationships, viscosity and turbulence.

"Dimensionless constant": that degree of magnitude utilized in mathematical equations to create a relationship between variables and empirical data.

"Multiple layers of distribution internals" as indicated in part above; although a single layer of internals may be appropriate for many applications, multiple layers of internals may be used to either enhance the distribution or the quality of the solidification product; and permit sequential addition of fluid. This involves placement at different levels; i.e., different levels from or in relation to the bottom of the receiving unit or container or the desired surface level of polymer in the container; additional distribution internals (manifold sub-assemblies, sections or extension arms), and special dimensioning and positioning of the of the openings in one or more manifold systems utilized in the invention. As indicated herein, these internals or manifold units can be fed separately at different time intervals/cycles; or fed, in parallel, at the same time or general time interval or cycle.

As with each of the preferred embodiments discussed herein, methods and mechanisms for remote introduction, immediate mixing and automatic distribution of a liquid, fluid or solid waste material are set forth for production of a safe dirt-like end-product. This product has the advantages set forth above for containment, packaging transportation or shipment, and burial.

Referring now to the drawings FIGS. 6A, 6B, 6C, 6D, 7, 8, 9A, 9B, 10, and 11, thereof, there is illustrated the primary exemplary preferred embodiments of the present invention addressing the device, and method for, solidification of an aqueous or fluid waste, shown at 10, referred to hereinafter as the invention, device and method.

The invention 10 utilizes a receiving unit, container, reservoir or vessel 1 which can have a rectangular or cylindrical configuration as illustrated; or, in preselected applications, can be of a different configuration. It will be understood by those skilled in the art that it is within the scope and spirit of the invention to provide the container 18 in a number of appropriate configurations.

In this regard, other related preferred embodiments of the invention utilize a specially sized and shaped receiving unit, container, reservoir, or vessel where the internals of the invention are designed to permit advanced loading of a known amount of polymer in a bottom portion of the unit. The liquid to be solidified is then added at a known rate, resulting in even distribution of the polymer employed throughout the mixture. Control of the feed rate is required to be in an approximate range to insure proper operation of the invention's internal manifold 70. The invention is provided with the distribution manifold subassembly 70 for properly distributing the liquid waste throughout a polymer supplied to, and dwelling in, the receiving unit 18. The manifold system 70 is provided with one or more arm members 74 which can be deployed in several preferred positions or configurations, without limitation, as illustrated, by example only, in FIGS. 6A, 7, 8, 9A, 9B, 10, and 11. It will be understood by those skilled that a number of manifold configurations and positional orientations can be employed within the scope and spirit of the invention; and that the drawing illustrations herein set forth examples only of such aspects. Each of the arm members are provided with the openings 76 having selected hole sizing and spacing to facilitate and permit the generation of sufficient backpressure to assure even distribution of the liquid waste in the receiving unit 18.

The manifold is aligned vertically with a known amount of polymer above and below its positioning. The size and shape of the manifold subassemblies and/or the arm members 74 of the subassembly 70, as affected by the configuration of the receiving unit 13, and the array or positioning of the openings 76, facilitate successful and functional distribution. The invention requires no spreading of liquids or solids in this embodiment. The liquid or waste fluid 20 is distributed into the solidification agent or polymer 19, and allowed to grow or increase volume to fill the receiving unit 18.

Figure 9A:
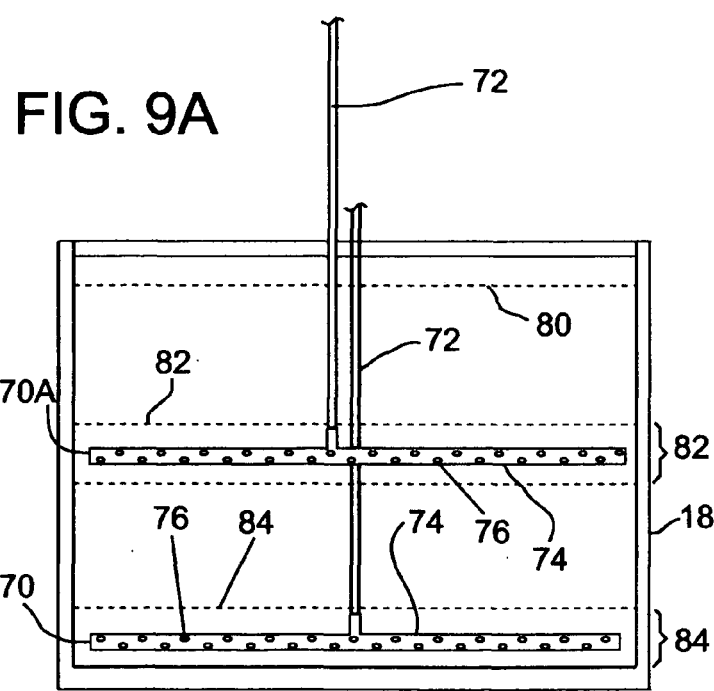
FIGS. 9A and 9B, each illustrate side views of another embodiment related to that of FIG. 7; 9A showing positional placement of two manifolds (70) and thus the utilization of more than one distribution manifold subassembly (70) and the respective levels of solidification agent used in conjunction with the manifolds; 9B showing the positional movement of one manifold (70) by pivotal or other manual, motorized or remote positional movement means for change of position during the solidification process of the invention.
Figure 9B:
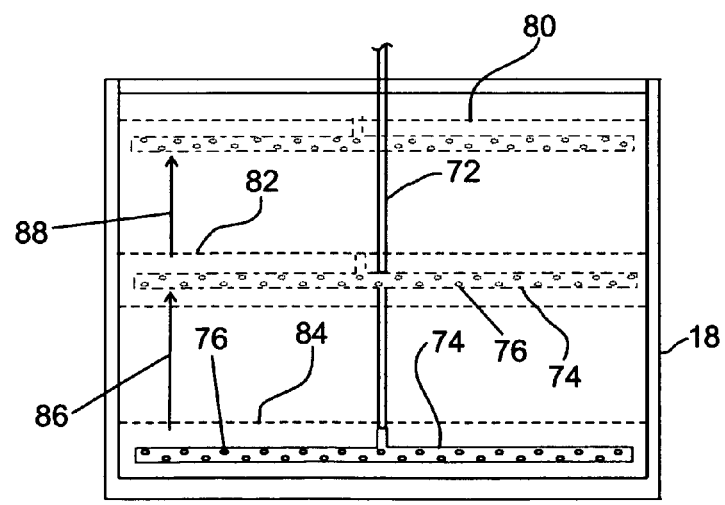

Other embodiments of the invention's method and device provide for multiple layer distribution of solidification agent 19, as shown by examples in FIGS. 9A and 9B. Such layers may be produced or structured at the same time (concurrently), or can be made through separate fills at different times (consecutively).

The manifold 70, and meth of deployment thereof, is suitable for use when solids are present, where the particle size of such solids does not exceed the size of the openings in the manifold 70, or otherwise cause bridging or plugging of the arm members 74 of the manifold 70.

Figure 6A:
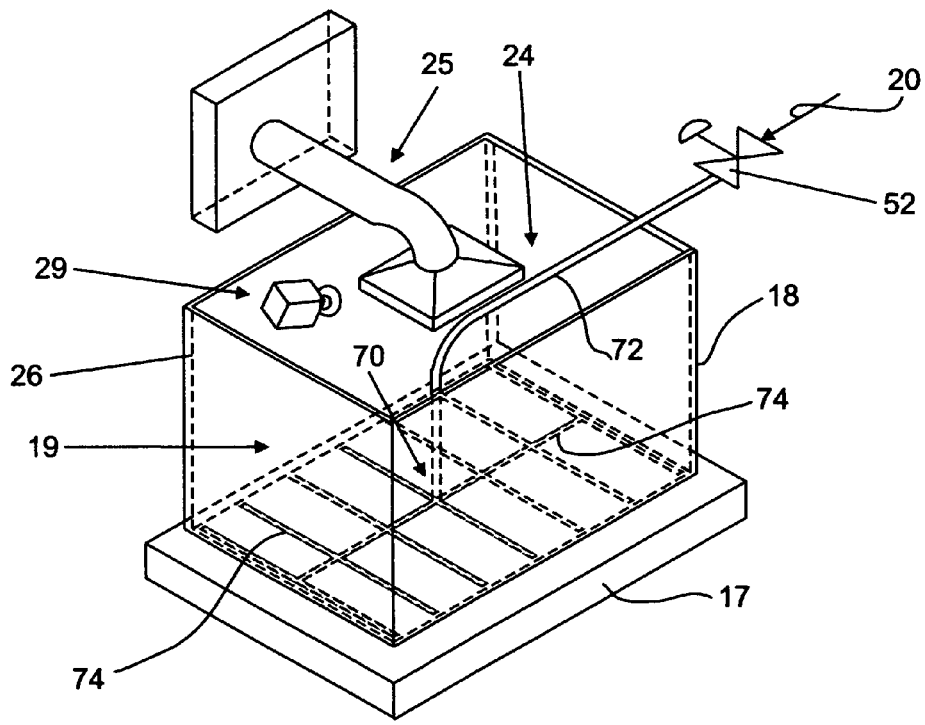
FIG. 6A is another embodiment of the present invention.

FIG. 6A illustrates the use in the invention 10 of the container 18, the camera port and camera or other monitoring device 29, the hood 24, the exhaust assembly 25, waste flow control valve 52, the liner or disposal bag 26 and the wading assembly 17; discussed herein. The manifold 70 is illustrated, by example, provided with arm members 74 arranged in a transverse and parallel relationship to one another within the container 18. The central conduit 72 is the supply channel for waste fluid 20, into the manifold 70.

Figure 6B:
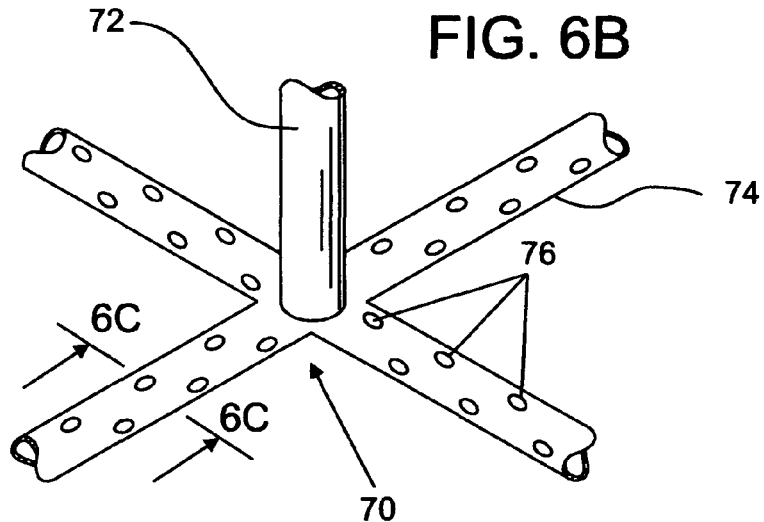
FIG. 6B is a perspective of a fragmentary portion of the embodiment of FIG. 6A.
Figure 6C:
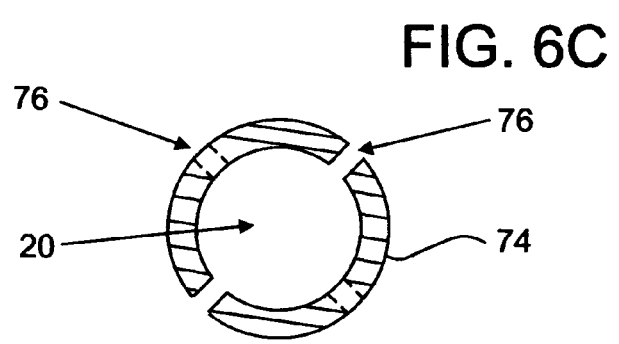
FIG. 6C is a cross-sectional view taken along the line 6C-6C, of FIG. 6B.

FIGS. 6B and 6C illustrate fragmentary portions of the manifold 70, showing the central conduit 72, the arm member 74, and the openings 76 provided and defined by the arm 74. In FIG. 6B, the openings 76 are set forth in an array of such openings which take the positional orientation of being spaced and offset from each other (one from or in relation to the other). It is within the scope and spirit of the invention to provide an array of such openings 76 in a different format or positional orientation in relation to each other. In embodiments of the invention this can be determined or preselected in accordance with the nature and form of waste fluid 20 to be supplied through the manifold subassembly 70. A cross-sectional view taken along part of the arm 74 is illustrated in FIG. 6C, illustrating the placement, cross-sectionally of the arm 74 and the openings 76, and showing that the waste fluid 20 moves through the arm 74.

The sizing or dimensions of the openings 76, as well as the number of openings 76 to be utilized in the manifold subassembly 70 is an important concept in preferred embodiments of the invention; although it will be appreciated that other diverse sizing and dimensions can be employed within the scope and spirit of the invention.

The design of the openings 76 is an important factor in proper distribution of the waste fluid 20 evenly to all parts of the receiving unit or container 18. For the purpose of maintaining even flow through all of the openings 76 utilized, the size and pressure drop through each of these openings 76 of the manifold 70 is important. The following, in this regard, are important factors in the proper sizing of the openings 76:

1. Available pressure
2. Size of the distribution manifold 70 (determined by container 18)
3. Size or Dimension of openings 76 of manifold 70
4. Maximum particle size in waste fluid 20
5. Viscosity of the waste fluid 20
6. Temperature
7. Spray penetration
8. Positional orientation of each opening 76

Preferably, the available pressure to the manifold 70 should be considered when determining the number and size of the openings 76. If insufficient pressure is available, then a booster pump can be utilized to increase the available pressure. Sufficient pressure is required to overcome frictional losses in the piping or conveyance means leading up to and including the manifold 70. The pressure exerted at all openings 76 should be essentially the same. Equal pressure in this regard facilitates the passing of equal volumes of waste fluid 20 through each opening 76. As a preferred means of so obtaining the same pressure at each opening 76 the pressure drop through the manifold or manifolds 70, after entry of the waste 20, should be essentially insignificant in relation to the pressure drop across the opening 76.

The cross-section of the arm 74 of the manifold 70 should be sufficient to limit the pressure drop due to flow and frictional losses to be essentially insignificant in comparison to the pressure drop across the opening 76. Pressure drop across each of the arms 74 forming a part (and utilized in) the manifold should be considered in the calculation of size of the opening 76 and pressure exerted. The manifold cross-section should also be sufficient to prevent blockage to downstream openings 76 on a particular arm 74 of the manifold 70.

The size of the openings 76 is, within the scope of the invention, determined by the required flow rate to the container 18 and the viscosity at the supply temperature of the waste fluid 20. It is also determined by the velocity of the waste 20 after leaving the opening 76, to give proper stream or spray characteristics. Therefore, the teaching and advantage of the invention is to provide a total number of openings which provides sufficient flow of the waste fluid 20 while maintaining proper stream velocity of the waste fluid.

In preferred embodiments of the invention waste viscosity is important with regard to the flow characteristics in the manifold 70 and pressure drop through the openings 76. The viscosity in this case is highly temperature dependent. In practice of preferred embodiments of the invention, measurements are taken or estimated at the supply temperature even though a small initial temperature loss may be seen. The vast majority of the waste will be near the supply temperature in most containers 18 of any relative size.

Temperature also affects the reaction rate of the polymerization-solidification reaction of the invention. With increased temperatures, it is preferred to fill the container 18 faster manner, so that the advance of the liquid polymerization front (solidification/polymer agent 19) approaches the advance of the waste fluid 20 being supplied to the container 18. This is done within the scope of the invention through adjustment of the supplied flow rate and the velocity of the streams (waste fluids 20) spraying into the polymer bed (solidification/polymer 19).

It is preferred that spray penetration of the waste fluid 20 from the openings 76 permit the waste fluid 20 to reach all areas of the container 18 where the polymer 19 is stored or positioned. The velocity of the spray of the waste fluid 20 leaving the openings 76 will, therefore, determine its ability to penetrate the raw polymer (solidification agent 19) and the partially polymerized waste (a portion of the waste fluid 20) located in the near vicinity or proximity of the openings 76 of the manifold 70.

The positional orientation of the openings 76 is important in preferred embodiments as a factor in reaching and distributing waste fluid 20 to all raw polymer or solidification agent 19 available and positioned within the container 18. In one preferred embodiment the openings 76 are positioned to the sides of the manifold arm members 74. Examples of such embodiments, without limitation, are illustrated in FIGS. 6B, 6C, 6D, 9A, 9B, 10 and 11; where the openings 76 are shown in positions around the periphery of the arm or arm members 74, where one opening 76 is spaced and offset from another opening 76.

It will be understood that the cross-sectional configuration of the arm members can be of a number of appropriate different shapes, peripheries or perimeters. Although, in making such a choice it is preferred in embodiments of the invention, that openings 76 be distributed more to the sides of the arm members 74 of the manifold 70 rather than vertically toward the floor (bottom area) of the container 18, or the top portion of the container 18. In such cases this positional orientation is avoided to minimize break through to the surface on the top portion, and pooling at the bottom area of the container caused by impact of the waste 20 with this bottom area.

The openings 76 are sized or dimensioned to permit the largest expected particle present in the waste fluid 20 to pass easily in leaving the arm 74 of the manifold 70. If the openings 76 are dimensioned too small, retention of particles can cause the openings 76 to be blocked or waste fluid flow to be restricted out of the arm 74. This can cause uneven distribution of the waste 20 in that area. Openings which are dimensioned too large can limit the number of openings utilized, thus limiting proper distribution. It will, however, be understood that the sizing and number of holes can be provided within the scope of the invention in a number of different ways, formats or designs, while still practicing the structural and functional advantages of the invention.

However, in selected embodiments of the invention it is preferred that the proper sizing of the openings 76 be determined in accordance with the following equation (A-1); when the $\beta$ value, as defined herein, is small:

$$r = (w/K\pi(2g_c(p_1-p_2)\rho^{0.5})^{0.5}, \qquad (A\text{-}1)$$

where:
r=radius (ft.) of each of the openings (76),
w=mass of waste per opening (76) (lb/sec),
K=constant (K=C/1-$\beta^4$)$^{0.5}$), and where K (for water) has a value of about 0.62 for Reynolds Numbers greater than (>) 1,000,
$\beta$=diameter of the opening (76) divided by the diameter of the given arm member (74) where the opening is located (ft),
$g_c$=gravitational constant (32.17 ft/sec$^2$),
$p_1$=pressure inside the given arm member (74) (lbs/ft$^2$
$p_2$=pressure outside the given arm member (74) (lbs/ft$^2$
$\rho$=density of the waste fluid (20) (lbs/ft$^3$), and
C=coefficient of discharge based on Reynolds number (dimensionless) and is a function of $\beta$.

For water K has a value of about 0.62 for Reynolds Numbers of greater than (>) 1,000, that covers typical flow rates in openings 76 of the arm members 74 of the manifold or manifolds (70) utilized. The C value is about 0.62 for water, as defined by conventional publications in the applicable art.

An example, only, of utilizing this equation, within the scope of the invention, without limitation of any kind, includes the following:
For example, if, in utilizing the present invention, one was dealing with a flow rate of about 25 gpm (gallons per minute) or 0.417 gps (gallons per second); and desired to employ about 50 openings 76 through one or more arm members 74 of the manifold (70) in positional orientation with the container 18; the following calculations would take place in accordance with $$w=(0.417 \text{ gps} * 8.33 \text{ lb/gal})/50 = 0.06942 \text{ lb/sec}$$

$$\beta = 0625 \text{ in}/0.50 \text{ in.} = 0.125$$

$$K = 0.62(1-(0.125)^4)^{0.5} = 0.62 \qquad \text{Equation A-1:}$$

$p_1$=2880 lb/ft$^2$
$p_2$=0
$\rho$=62.4 lb/ft$^3$
C=0.62
r=radius of hole in feet;
Substituting into equation (A-1a):

$$r = (w/K\pi(2g_c(p_1-p_2)\rho)^{0.5})^{0.5}$$

$$r = 0.0694/0.62 * 3.1416 * (2 * 32.17(2880-0 * 62.4)^{0.5})^{0.5} \qquad (A\text{-}1a)$$

r=0.003225 ft. or 0.0387 in.

If one desires, on the basis of Equation (1-A) to find the required pressure, in utilizing the present invention, when the mass flow rate per opening 76 (for example 0.0694 lb/sec) and the diameter of the opening 76 (for example, 1/16 in.) are known; this can be found, within the scope of the invention, in accordance with Equation (A-2):

$$p_1 = \{(w/K\pi r^2)^2/2g_c\rho\} - p_2. \qquad (A\text{-}2)$$

In accordance with the example given for mass flow rate per opening (76) and diameter of the opening (76), it follows that:

$$p_1 = \{(0.0694/(0.62 * 3.1416 * (0.002604)^2)^2/(2 * 32.17 * 62.4)\} - 0$$

$p_1$=6877 lb/ft$^2$ or 47.8 psig.

Additionally, on the basis of Equation (A-1), within the application and scope of the invention; the number of openings 76 needed, in positional orientation within the container 18 on one or more arm members 74, can be obtained, if the pressure differential and size of the openings 76 is known. A further derivation of Equation (A-1); namely Equation (A-3) is utilized for this purpose, in combination with Equation (A-4) set forth below:

$$w = Kr^2\pi(2g_c\rho(p_1-p_2))^{0.5}, \qquad (A\text{-}3)$$

$$N = W/w \qquad (A\text{-}4)$$

This is Shown, by Example Only (without Limitation), in the Following Calculations based on Equations (A-3) and (A-4). In so doing:

$$w = 0.62(0.002604)^2 * 3.1416(2 * 32.17 * 62.4 * (2880-0))^{0.5} \qquad (A\text{-}3)$$

w=0.04491 lb/sec. per opening (76);
If the total flow rate, W, is 25 gpm or 3.47 lb/sec., then the number of openings (76), designated herein by N, required in this case example, is as follows:

$$N = W/w$$

$$N = 3.471/0.04491$$

$$N = 77 \qquad (A\text{-}4)$$

Seventy-seven (77) openings (76) would be required in this case example, for the purpose of properly distributing the waste fluid through the manifold 70 into the container or receiving unit 18.

Figure 7:
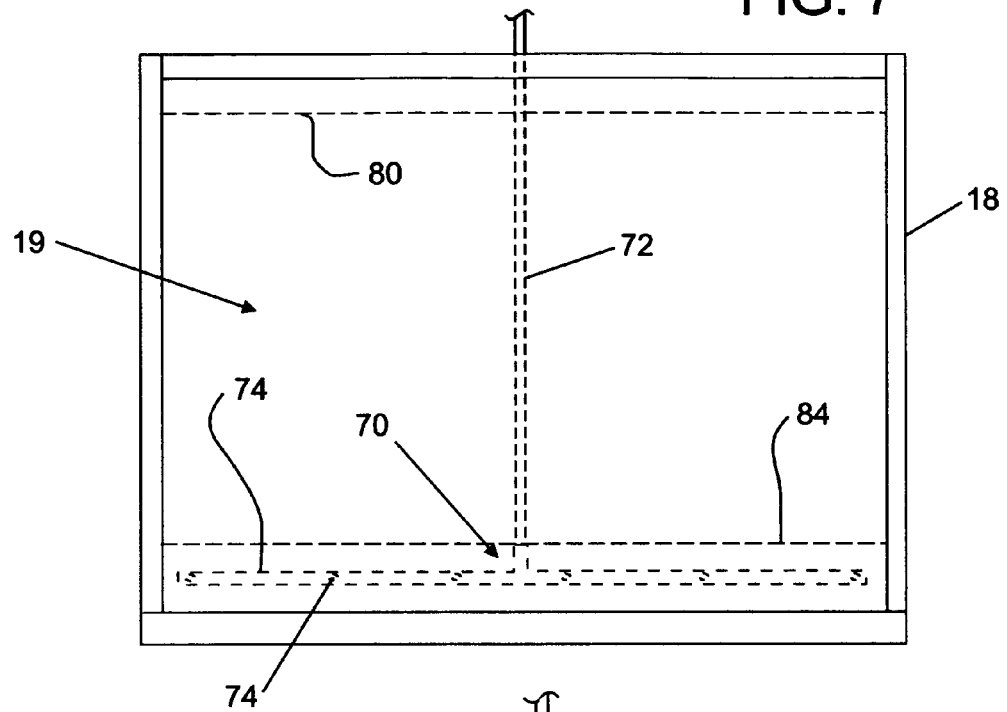
FIG. 7 is a side view of an embodiment of the invention similar to that of FIG. 6A.
Figure 8:
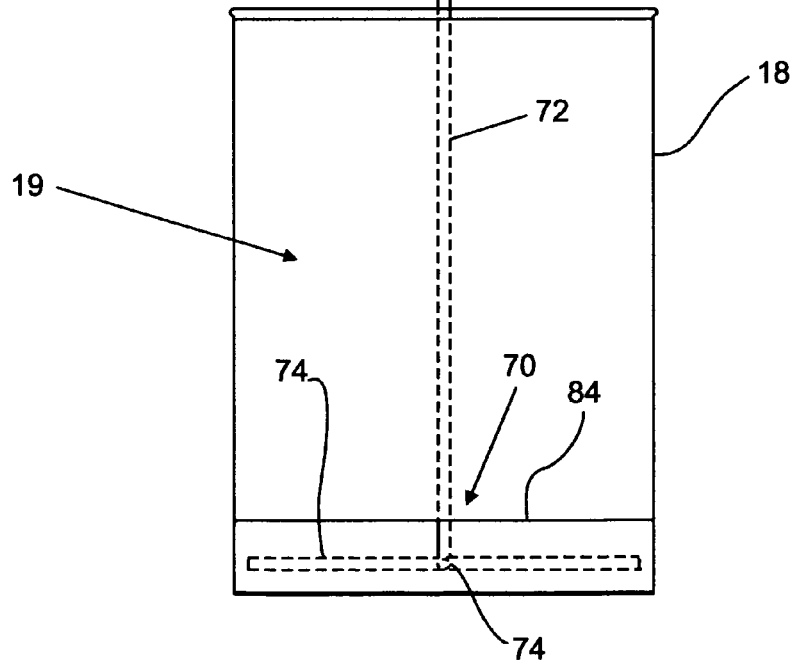
FIG. 8 is an end view of the embodiment of FIG. 7.
Figure 10:
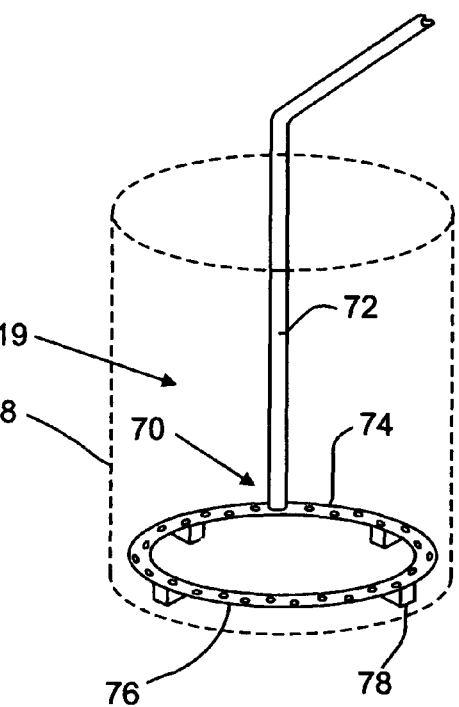
FIG. 10 is a perspective view of a different but related embodiment of the present invention, using, by example only, another configuration of the distribution manifold subassembly (70).
Figure 11:
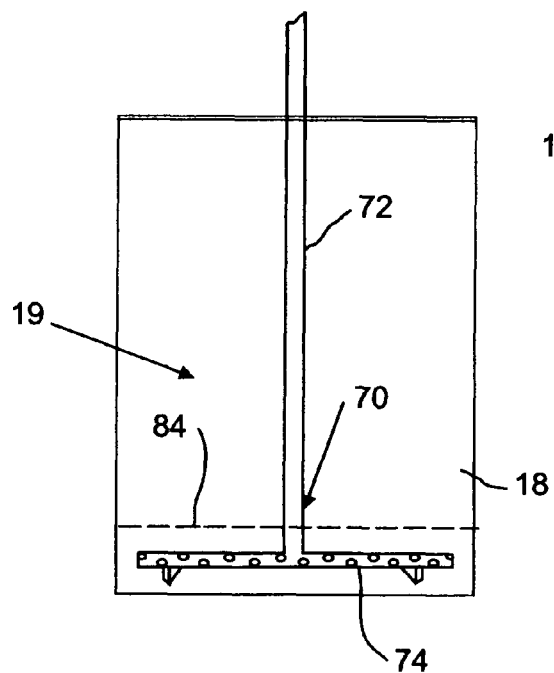
FIG. 11 is a front view of the embodiment of FIG. 10.

FIGS. 7 and 8 show a front and side view, respectively, of a preferred embodiment of the invention similar to that of FIG. 6A. Shown therein is the central conduit 72, bringing in the supply of waste fluid 20 to the arm members 74. The exemplary illustration is shown with an initial, or preselected, first polymer fill line 84 of solidifying agent 19. This fill line is designed to be in a proximate positional relationship to the manifold 70 as shown by example therein. As the solidification process continues, in the contact, admixture and combination of the waste fluid 20 and the polymer 19, the waste level will eventually be at the final waste fill line 80 to complete the process of polymerization and solidification of all of the waste fluid 20 supplied to the receiving unit 18 containing the polymer 19. This is shown by example in FIGS. 9A and 9

FIG. 9A shows another related embodiment of the invention; illustrating, by example only, the utilization of the additional or further manifold system 70A; and in various other cases the positioning of more than one distribution manifold; and the respective levels of solidification agent used in conjunction with the manifolds; i.e., the position or placement of each distribution manifold subassembly 70.

If the container 18 cannot be loaded at one time or flow has to be suspended for some reason, the remainder of the waste fluid 20 can be supplied to the container 18 and solidified by adding an additional distribution manifold 70 just above the previously solidified material as shown by example in FIG. 9A; or pivoting or permitting movement from the position of the originally positioned manifold 70, as shown by example in FIG. 9B as to the first position 86 and the second or further position 88 of the manifold 70, at an appropriate time in relation to the initial and secondary (or further) solidification processes. The additional or further polymer fill line 82, or layer, is added as the polymer or solidification agent 19 was added in the initial loading into the container 18. The polymer 19 is filled to a point proximately above the further manifold 70A or the manifold as it is positioned after movement to the second or further position 88.

In cases where the further manifold 70A is added; or in cases where the manifold 70 is positioned or pivoted to another level within the container 18 (from position 86 to position 88) or allowed to float to this location as the process continues; sufficient polymer 19 is placed above the openings 76 of each respective manifold (70, 70 repositioned and 70A) to permit the entry and rising of the waste fluid 20 within the polymer 19. Also, sufficient polymer 19 is placed below the openings 76, relative to the bottom of the container 18 or an existing or partially completed solidification surface, to prevent waste fluid 20 from pooling bellow the openings 76.

As indicated in part above, the manifold 70, in a preferred embodiment of the invention, is floating in the polymer 19 and permitted to work its way to near the surface or final fill line 80 just prior to completion of the entry of the waste fluid 20 or pumping or other means conveying the waste 20. Also, multiple levels of distribution manifolds, each having the openings 76, can be utilized in embodiments of the invention when dealing with containers 18 which are deeper or otherwise dimensionally larger.

Each respective manifold utilized is positioned within the container 18 so as to not be positioned too near the edges of the container 18; thus preventing surface breakthrough from occurring along the wall of the container. As indicated above, the size or dimension of the openings 76 in any manifold used herein is important to the distribution of the waste fluid 20 through the polymer of solidification agent 19.

Figure 6D:
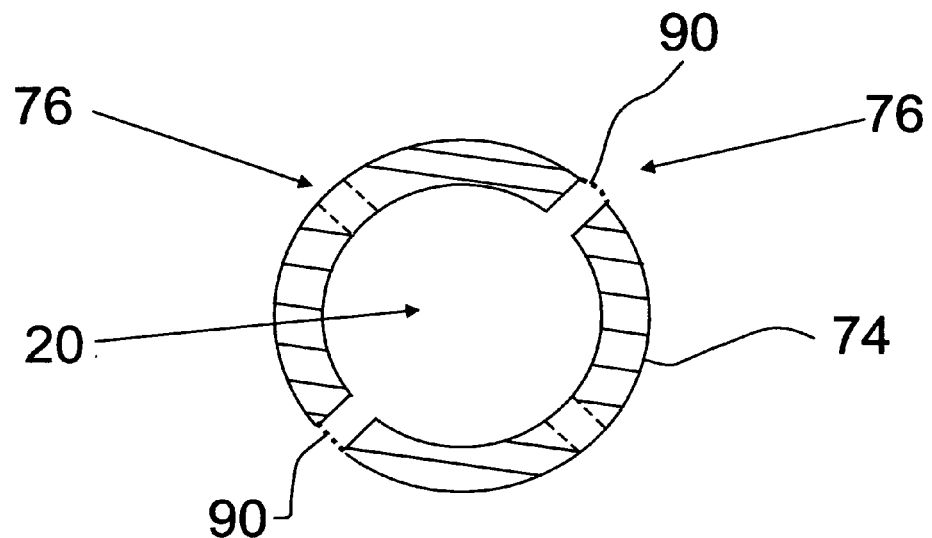
FIG. 6D is the cross-section view of FIG. 6C, illustrating the protective member (90) in a preferred embodiment of the invention.

In additional preferred embodiments the openings 76 of respective manifolds are provided with the protective member 90, shown by example only in FIG. 6D. Protecting the openings 76 of the distribution manifold (70, 70 repositioned, or 70A) is important for preventing polymer 19 from entering the openings 76 of the manifold and causing blockage during the initial entry of waste fluid 20 (or subsequent fillings or entries), thus resulting in poor distribution of the waste fluid.

In such embodiments within the scope of the invention, the protective member 90 is a fine screen-like material, which can be fabricated from a diverse number of materials. Additionally, the protective member 90 can be a tissue paper/plastic this is displaced or dissolved upon contact with a liquid or fluid. Also, very fine openings, for example such openings in a slotted pipe, can be used that prevent entry of the polymer 19 through the openings 76 and into the arms 74.

In accordance with the teachings of the invention set forth in FIGS. 6A through 11, and discussed above, the invention and method of combining the solidification agent 19 and the waste fluid 20, for solidification of the waste 20 and production of a solid or dirt-like product, is set forth as part and parcel of the scope of the present invention herein. The method 10 includes steps for positioning the solidification agent or polymer 19 in the container 18 to form a first or primary level, as shown by example in FIGS. 7, 8 and 11.

Further included in the method 10 is the step of positioning, installing or deploying within the container 18 one or more distribution manifold subassemblies 70. Each manifold 70, as discussed is provided with a number of openings 76. Further included in the method is supplying the waste fluid 20 through each of the openings 76 of the positioned manifold, for admixture and chemical combination or polymerization of the waste materials with the polymer 19 in the container 18.

Additionally, as a part of the method 10 in preferred embodiments, the openings 76 are sized or dimensioned, and the number of openings 76 to be utilized is determined, in accordance with the waste materials 20 to be supplied and the pressure under which the waste material is to be supplied to the container 18. The discussion and teachings regarding this are set forth above.

As shown by example in FIGS. 7, 9A and 9; additional levels of polymer 19 can be added to process additional volumes of waste fluid 20 to be added through the manifold 70, or through respective multiple manifold systems 70.

Embodiments of the invention include the movement of one manifold 70 from a first position 86 in the container 18 to a second or further position 88 in the container to position the manifold 70 in a position to provide additional waste 20 to a fresh or further level of polymer 19 at a position which best serves the most efficient polymerization of the waste 20 as it enters the container, as discussed above. Additionally, in this same regard, more than one manifold 70 can be pre-positioned in the container to supply waste 20 to anticipated levels of polymer or solidifying agent 20 to be positioned in the container during the process.

Also, in accordance with a preferred embodiment of the method of the invention, the arms 74 containing the openings 76 are blown clear with air at the completion of the waste fluid delivery to speed complete solidification; although polymer 19 will eventually either migrate into the distribution legs or draw the remaining liquid or fluid waste out into the polymer 19.

Referring to the drawings, FIGS. 1 through 5, 16 through 22, and 24 through 27, thereof, there are illustrated additional exemplary preferred embodiments of the present invention addressing the method of, and device for, solidification of an aqueous or fluid waste.

Proper mixing efficiency and quality assurance of the final dirt-like product is ensured by control of the streams employed in the present process. Control can be provided on a Fixed Rate Basis or on Variable Rate Basis. Under a Fixed Rate Basis, the process streams, including solidification polymer/agent and waste liquid/concentrate/slurry, are controlled on a fixed or predetermined rate by means of orifice, valve, other flow control or mass-rate control, as determined by PCP testing. As examples only, valves 52 and/or 54 are illustrated in FIGS. 1, 1A, 3, 5, 6A, 14, 15A, 15B and 17A. The valve 54 is used in connection with, or a part of, the metered polymer supply system of the invention, and the valve 52 is used as a part of the metered waste supply system of the invention.

Under a Variable Rate Basis, the process streams are controlled on a variable rate by means of the valves 52 and 54. The flow of polymer is controlled to match the flow rate of the liquid/concentrate/slurry or visa versa, predicated on the circumstances of the specific installation. Control of the process in preferred embodiments is accomplished by interface of flow-rate/mass-rate liquid meters coupled with a loss-in-weight or volumetric polymer fee regiment; as shown by example only, with regard to the scaling assembly 17, in FIGS. 1, 3, 5 and 15B. Optionally, a combination of the fixed and variable components may be used in relation to the present invention, to achieve the same purposes and result discussed about and herein.

These embodiments have the ability to easily start and stop the process by stopping both streams (polymer and waste), as disclosed and illustrated herein, almost simultaneously. In this regard, only a very small quantity of liquid is usually required to clear the polymer supply chute (discussed later herein) of polymer.

Also, in these first exemplary embodiments, sludges (liquid/solid mixtures) can be processed, as long as the material is fluid enough to permit the mixing to occur at the sludge polymer interface, later discussed herein regarding the waste trough and angled surfaces, along which polymer makes contact with the waste prior to being directed to a container 18, solidification container or fill container.

The present method and device embodiments for carrying out this method provide for polymer solidification agent 19 being added, in a metered manner, to the waste stream prior to, or contemporaneous with, the waste fluid 20 being added to the container 18; as shown, by exemplary illustration, in whole or in part, in FIGS. 17A, 17C, 17D, 17E-17G, 18-19, 21, 23-24, and 28-29.

In this regard, volumetric equipment is used to add the solidification agent 19 (polymer or other substances described herein)(See FIGS. 1 and 23) to the waste fluid 20. This equipment as utilized in the method and the included device, as a part of these embodiments in the invention, includes, without limitation, the Loss-in-weight feeder subsystem 21 (shown by example in FIGS. 1, 1A, 3, 4, 5, and 15B, among other drawings); as well as other types of subassembly equipment utilizable such as volumetric rotary screw feeders, air transport injection systems, and special orifices (as described later herein).

Regarding these preferred embodiments, the waste liquid or fluid volume 20 can be metered and controlled by the use of such subassembly equipment within the method, or as a part of the facilitating overall device, including flow meter controlling, flow control valve, special orifice for flow control, and VFD controlled pump controlled from a flow meter. As indicated, in part, above; the solidification agent 19 can be added, within the scope of the invention, to lifts before, during or after the waste fluid 20 addition.

Optional inline mixers with solids injection equipment is utilizable if residence time is minimized so as to prevent solidification to occur prior to exiting the system or the equipment is adapted to tolerate the solidification and the ejection of a solidified material.

The concentration of solidification agent 19 is adjusted to make the product more or less dirt-like and increase or decrease the pressure at which the water may be released. Solidification agent 19 can be added to lifts 23 before, during or after the addition of waste fluid 20 (or waste concentrate).

Means to enhance distribution in the container 18 (whether process, shipping or burial in nature) include the use of oscillating spreaders, linear activated spreader, other types of spreader and vibration or shaker use.

Figure 1:
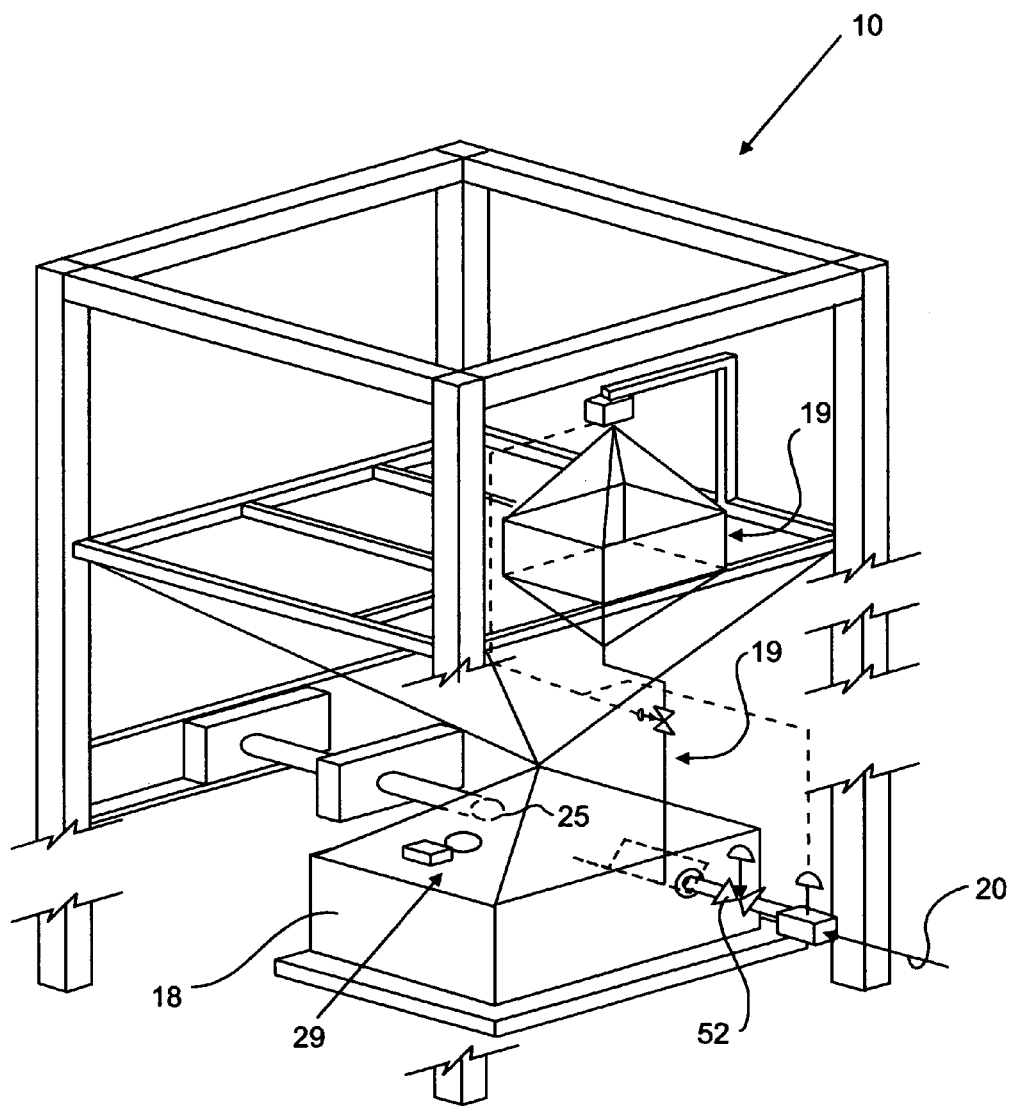
FIG. 1 is a side perspective view of an embodiment of the METHOD AND DEVICE FOR EVAPORATE/REVERSE OSMOSIS CONCENTRATE SOLIDIFICATION of the present invention.
Figure 1A:
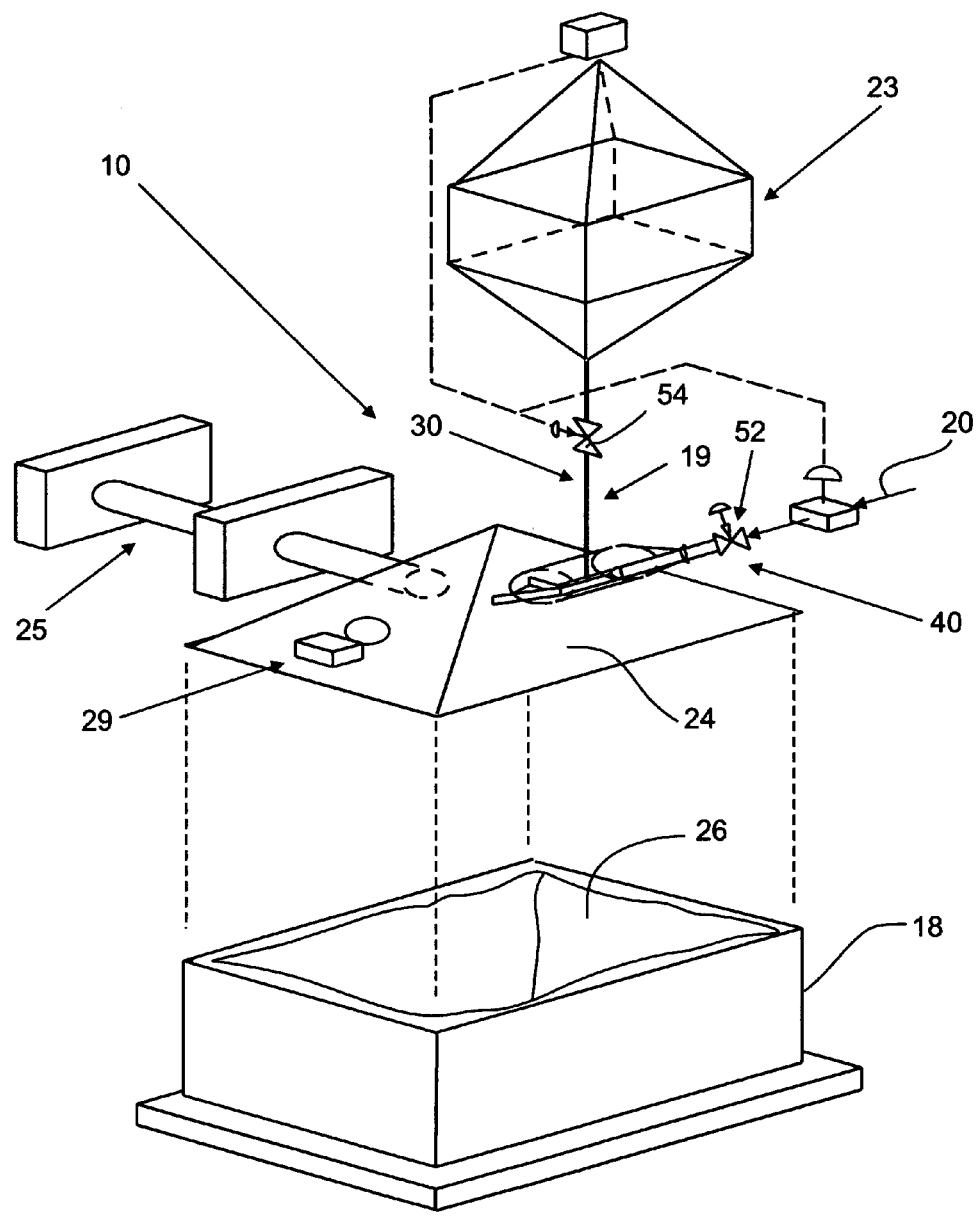
FIG. 1A is an elevated perspective view of an embodiment related to that of FIG. 1.
Figure 1B:
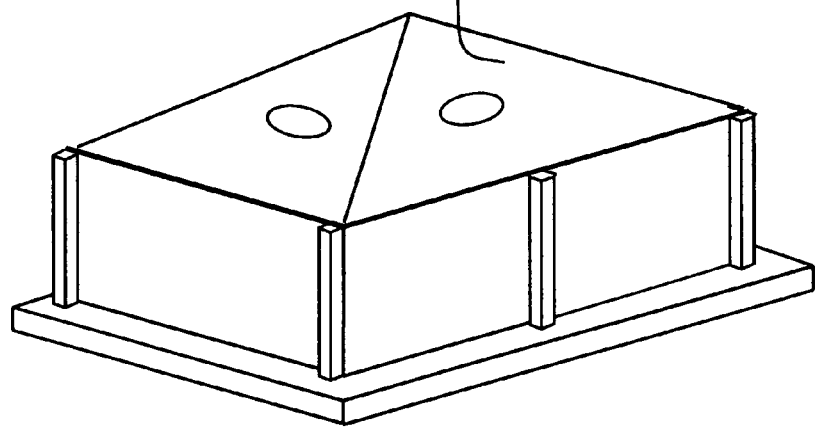
FIG. 1B is an elevated perspective view of the hooded container of the present invention, as it relates to the embodiments of FIGS. 1 and 2.
Figure 1C:
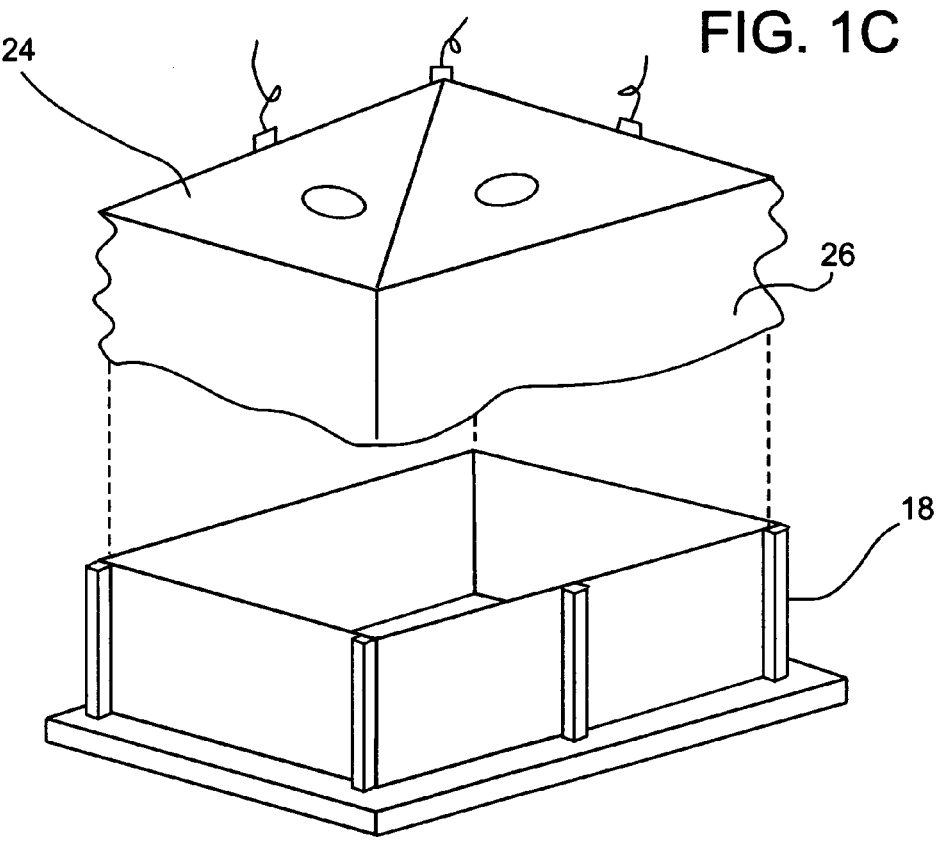
FIG. 1C is a side-elevated perspective view having a partially exploded portion, of another embodiment of the hooded container of FIG. 3.
Figure 2:
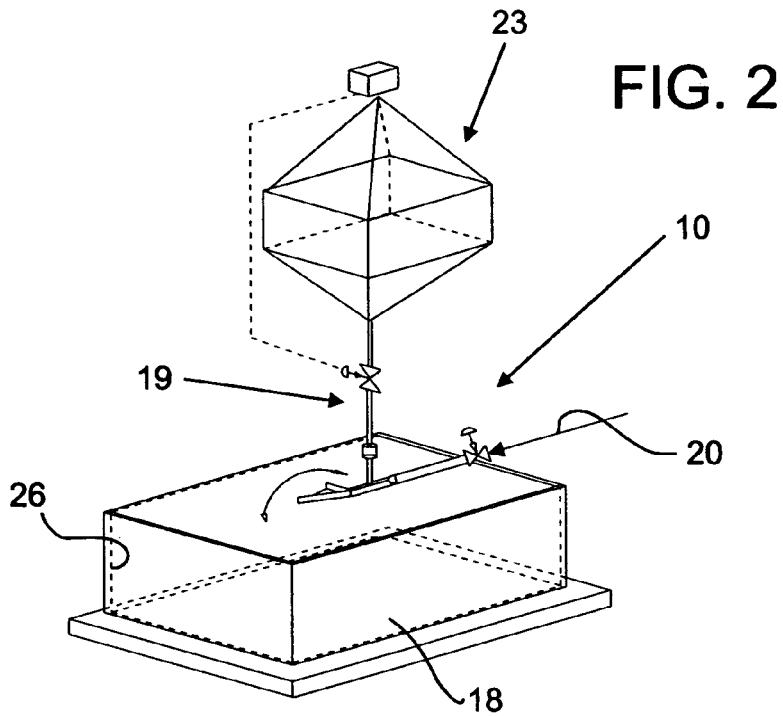
FIG. 2 is a side elevated perspective view of an embodiment related to that of FIGS. 1 and 1A.
Figure 3:
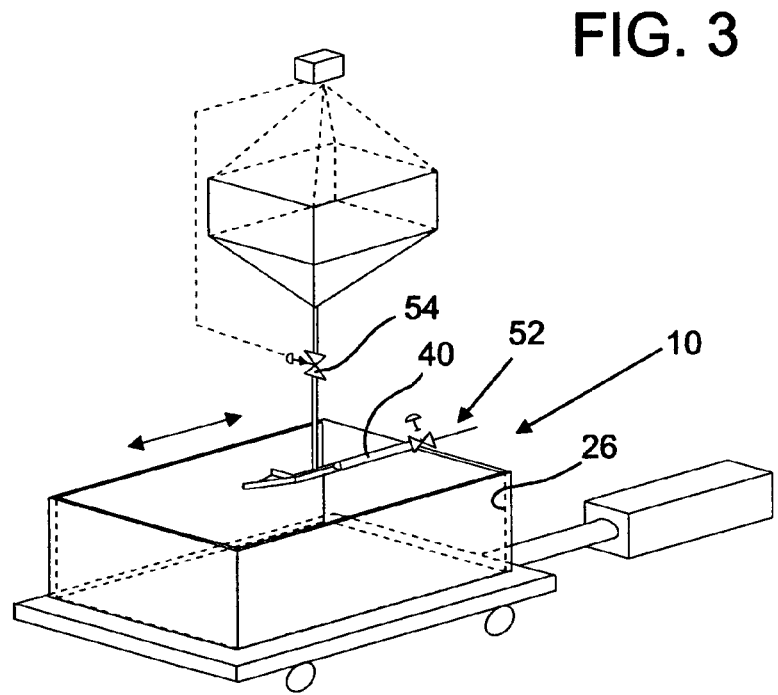
FIG. 3 is another elevated perspective view related to the embodiments of FIGS. 1 and 1A.
Figure 4:
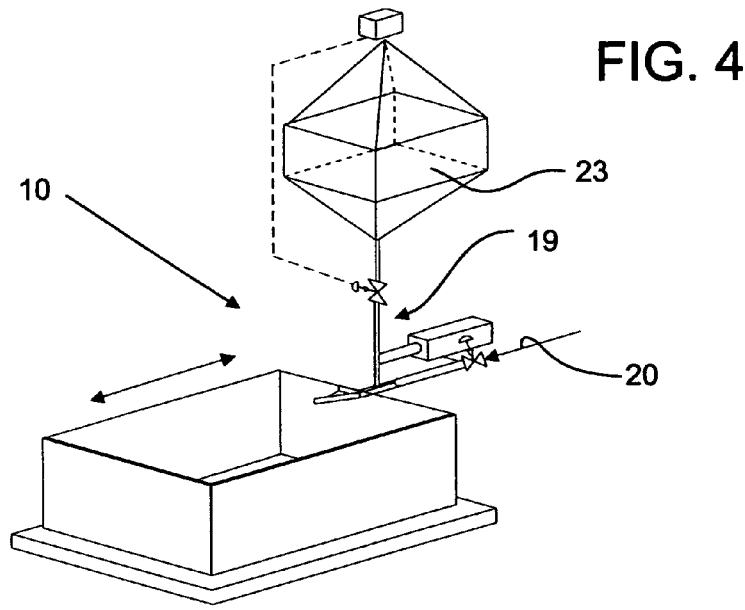
FIG. 4 is another elevated perspective view related to the embodiments of FIGS. 1 and 1A.
Figure 5:
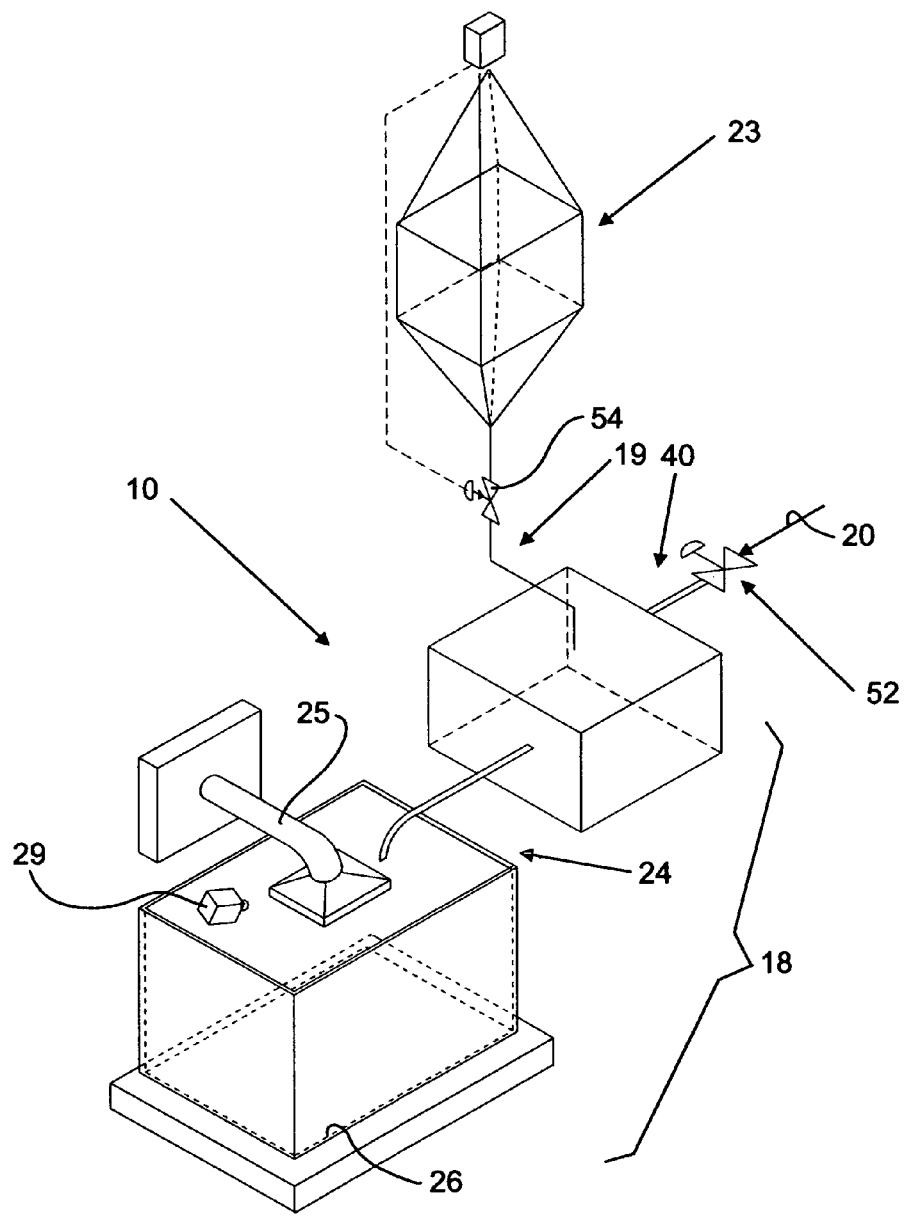
FIG. 5 is an elevated perspective view of an embodiment related to that of FIG. 1.

The hood 24 is utilized to contain steam, spray splash, contamination or spattering occurring in or adjacent to the container 18 as solidification agent 19 and/or waste fluid 20 enters the container 18; as shown by example in FIGS. 1-1C, and 5. The hood 24 can be integrally or securely attached to a liner 26 which extends, when installed, into the container 18; or it may be releasably connected or attached to the liner 26 or the container 18.

The HEPA vacuum exhaust subassembly 28, shown by example in FIGS. 1, 1A, 5 and 6A, is employed, when used, to provide an integral condenser for liquid recycle into the container 18. This also provides immediate solidification of condensed liquid so it does not have to be stored for later solidification. It also helps in minimizing storage of contaminated equipment. Also provided, when needed, as a part of the subassembly 28 is the exterior condenser for liquid collection. Liquid is collected for return to the plant facility or for re-injection, which permits easy reuse. Additionally, a camera port and camera 29 (or video subassembly) can be employed, as shown by example only in FIGS. 1, 1A and 5.

As indicated in part, above, the hood 24 is fitted to a liner 26 (or liner holder) and, in preferred embodiments, is removable or reusable. The scaling assembly 17, or sub-system, is used under the container 18 as control on fill and media usage. This will also provide control for overfill and media weight control, as well as providing the shipping weight of the container when needed.

A preferred embodiment of the invention uses a transferable media bin from one solidification unit to the next. The use of liners or disposal bags 26, in the place, in and of itself, of the container 18 (hard-sided in nature in many instances) helps to facilitate the transport of the solidified waste product at the end of the process. In such a case the liner or bag 26 is used alone as the container 18 would be used; or is used in association with the container 18, where the container only serves the purpose of providing support for the liner or bag 26. This is shown by examples only, as to these aspects, in FIGS. 1A, 1C, 2, 3, 5A, and 5. The liners or bags 26 are preferably DOT IP-1 or IP-2 rated for use with nuclear or RCRA materials, which are accepted by burial facilities for disposal.

The invention, therefore, provides a method and device for mixing a polymer and a waste material to produce a solid or dirt-like product. In preferred embodiments of the invention, a container 18 is provided for receiving a mixture of a solidification agent 19, or polymer, and the subject waste fluid 20. And a method, and device for so doing, is set forth in the present invention for providing in a metered, pre-controlled or pre-selected manner, each of the components (polymer and waste) in a manner so that they are appropriately mixed; and are made available in relation to the container 18, in a solidifying or solid state, so that they can advantageously be positioned within the container for solidification, storage, shipment and/or burial.

For this purpose, the invention is provided in preferred embodiments with a metered solidification agent (polymer) supply assembly 30 and a metered waste trough supply assembly 40.

The polymer assembly 30 is linked to a polymer supply area 32, and the waste trough supply assembly 40 to the waste supply area 42.

In preferred embodiments, the waste trough assembly 40 acts as a means for mixing the waste fluid 20 with the solidification agent 19; and for supplying the metered and mixed polymer 19 and waste 20 to the container 18 such that it will position itself, and properly solidify, within the container 18.

The invention is provided with the hood 24 or hooded area, as discussed in part above; shown by example in FIGS. 1 through 1C (1-1C). In some of the preferred embodiments, the hood 24 houses at least a portion of the metered polymer assembly 30 and the metered waste trough assembly 40, and protectively shields the container. The hood 24 optionally defines a port or other means for supporting a camera or other monitoring device 29. In addition, the hood also supports or includes an exhaust assembly 25, or means for removing gaseous matter from the container 18.

The invention 10 is further provided with the liner or disposal bag member 26, which is attached in preferred embodiments to the hooded area 24, as shown by example in FIG. 1C.

It is preferably sized to extend within the container 18, in substantial part or to the boundaries of the perimeters of the container. Other embodiments utilize liner 26 installation within the container's perimeters or boundaries, without specific attachment to the hood 24, as shown in FIG. 1A.

The invention has optional means for determining the relative amount of polymer 19 supplied by the metered polymer assembly 30. This is shown, by example only, in one embodiment as a Mixer-bin support subassembly 34 in FIG. 15B. The support 34 is functionally engaged in relation to the polymer supply area 32; and in this usage determines polymer amount supplied by relative weight of the polymer supply area 32.

As shown by examples only in FIGS. 1A, 17A, 17C-17G, 18, 19, 20, 21, 23, 24 and 28; the metered polymer assembly 30 and the metered waste trough assembly 40 are in functionally proximate, proximal or close position in relation to one another; and the polymer makes contact with the waste in the metered waste trough assembly 40 prior to entering the container 18.

The invention is provided with the polymer supply-waste trough assembly for positioning the polymer assembly and the waste trough assembly in relation to the container. This is shown by examples in FIGS. 17C-17G. Many different types of movement mechanism, preferably remotely activated and controlled are utilizable to provide relative movement in this regard. This facilitates the mixture, solidification and positioning of the polymer and the waste. The pivot assembly 44 is provided as a part of the waste trough assembly 40, in preferred embodiments, to position the waste trough 40 in relation to the polymer assembly 30 and the container 18; and to further facilitate entry conditions of the polymer and waste after initial mixture in the trough 40.

The length of the metered waste trough 40 is an important factor in the present invention 10. The design of the trough length is dependent upon the following factors: (1) Waste temperature, (2) Linear Plow rate, (3) TDS content of waste, (4) Trough turbulence, (5) Waste viscosity, (6) Polymer loading ratio, and (7) Shape of Trough. The proper Trough length is important to minimize solids build up while maximizing mixing and polymer 19 distribution in the waste 20 prior to falling into the container (18). The waste temperature is a very important factor with regard to reaction rate; and, therefore, even distribution in the waste. The higher the temperature the faster the solidification occurs. The rate of reaction approximately doubles for every 10° C. (18° F.) of temperature rise. The flow rate must, therefore, be adjusted based on the temperature of the waste to compensate for temperature; or, as is relevant here, a different length trough can be substituted if the trough length exceeds maximum length after polymer impingement point, L sub.M, for given conditions.

The length L sub.Max of the trough 40, is determined in accordance with the equation: L sub.Max=(equals) t sub.gel x (*) v/3; where t sub.gel equals the time to gelation upon addition of the polymer agent 19, in seconds; and where v equals the velocity of liquid in the trough 40, in feet per second. In this regard, in an exemplary calculation, L sub.Max=2*2.67/3=1.78 feet (ft.) or 21.4 inches (in.). The minimum length of the trough 40, M sub Min, of the trough beyond polymer impingement should be as follows to obtain optimum mixing: L sub.Min=t sub.gel*x/7; with the sample calculation in this regard being set forth as: L sub.Min=2*2.67/7=0.76 ft. or 9 in.

By using a given trough length, the linear rate of flow in the trough can be increased by either increasing the flow rate of waste 20 entering the trough 40 or by increasing the angle away from the horizontal of the trough 40. gravity to accelerate the waste 20.

As the TDS content increases, the rate of reaction of the polymer 19 in solidifying the waste 20 decreases. Therefore, a longer reaction time is required.

The design of the trough 40 with regard to the turbulence and distribution of the waste are other factors involved. Turbulence generated in the trough helps to increase the rate of mixing of the waste and the polymer. Actual turbulence promoters can be added through vanes 41, tabs 43 and mixing generators 45 (or trough bottom variations or channels); as shown by example, only, in FIGS. 20 through 22. In the present invention, all of these elements help in disrupting laminar flow and generating turbulence in the waste 20. Also, the distribution of the waste can be evened in the trough through the use of vanes in the trough 40, or in the orifice 40A (or control valve of the trough 40).

Viscosity of the waste tends to decrease turbulence and this increases mixing time for the polymer 19, or requires additional turbulence in the trough. Viscosity will also decrease the linear flow rate in the trough due to frictional forces. Viscosity of the waste may require that the depth of the waste stream in the trough be limited to provide optimum distribution of the polymer 19 in the waste stream 20 as rapidly as possible because once gelation 47, shown by example in FIG. 19, begins the rate of miring decreases accordingly.

Polymer loading ratio is determined through a process control procedure (PCP) where small samples of the waste 20 are used in testing to determine the optimum concentration of the solidification agent 19 to be used. These small PCP tests provide accurate scale-up for full size solidifications. Depending upon the required final consistency for the waste product 50, shown by schematic or symbolic, illustrative example, only, in FIG. 23; the polymer ratio to waste can be varied. The more polymer added the stiffer the gel 47 (gelation) is that is formed. Also, the stiffer the polymerized waste, the higher the chemical bonding of the water in the polymer matrix. This boding strength or stiffness can be measured two ways and visually determined a third way, as follows: (1) Pressure can be applied to the solidified material to determine at what pressure water will be released from the polymerized solid; (2) The angle of repose of the solidified waste 50 (product) can be estimated by dumping material on a flat surface and measuring the angle from horizontal that the material stops flowing; and (3) As the level polymer increases, the polymer will remove all available liquid causing air to intrude into the mass of material changing the material from continuous liquid phase to a continuous air or gas phase with the formation of granules of gel separated by air gaps, and as more polymer is added the gel forms into more granular particles.

The shape of the trough 40 can also vary the design length. A trough with a varying depth can require a shorter length as the shallow depths will be more affected by surface drag, resulting in higher potential for solidification to occur at the edges, further increasing drag. Troughs with an even depth across the entire width will have much less edge effect. Another part of the present method to increase mixing is to have a fanned effect where the depth increases as the width of the trough increases. In the present method, this can often be combined with significant increase in velocity caused by gravity in a trough 40 which is sloping. In the invention, all of these teaching apply to most all shapes that the trough 40 may be designed or fabricated in. Also, the trough 40 can be covered or open. Although many shapes may be utilized for the trough 40, the trough configuration is preferred, as shown by example in FIGS. 18-22, 24, 25.

In preferred embodiments, the trough 40 is provided with the waste flow control valve 52, or waste metering valve. The metered polymer supply assembly 30 is provided with the polymer flow control valve 54, or polymer metering valve. Each is shown by example in FIGS. 1, 1A, 19, 20, 23, 24 and 28.

In other preferred embodiments of the present invention, the metered polymer supply assembly 30 is provided with the catching and flow directing subassembly 56, and the polymer chute 58 which is connected to, or placed in communication with, the subassembly 56. Also provided in these preferred embodiments is the metering flow valve 54A; as shown by example in FIGS. 24 and 28; located generally between the connection, or communicating portion, of the catching and flow directing subassembly 56 and polymer chute 58. In this regard, the subassembly 56 is preferably provided as a funnel or conical-shaped member to catch and direct polymer to the chute 58, and then to the waste trough 40.

For the best functional purposes in accordance with the objects of the invention, in these embodiments, the polymer chute 58 is preferably sized on the basis of the first cross-sectional lateral dimensional magnitude, the second cross-sectional lateral dimensional magnitude and the center cross-sectional dimensional magnitude, as generally or schematically shown by example in FIGS. 16, 16A, 16C and 16D. In corresponding manner, the metered waste trough 40 is designed to have the first cross-sectional lateral dimensional magnitude, the second cross-sectional lateral dimensional magnitude and the center cross-sectional dimensional magnitude.

Therefore, in this regard, the polymer chute 58 and the metered waste trough 40 are cross-sectionally dimensioned in relation to one another in accordance with the equation: $a/A=b/B=c/C$, where: "a" equals the first cross-sectional lateral dimensional magnitude of the polymer chute; "b" equals the center cross-sectional dimensional magnitude of the polymer chute, and "c" equals the second cross-sectional lateral dimensional magnitude of the polymer chute; and "A" equals the first cross-sectional lateral dimensional magnitude of the metered waste trough, "B" equals the center cross-sectional dimensional magnitude of the metered waste trough, and "C" equals the second cross-sectional lateral dimensional magnitude of the metered waste trough. This is shown by general example in the FIGS. last referenced, above.

As indicated, in part, above, the relationship between the polymer supply assembly 30 and the waste supply assembly 40, within the scope of the invention, is one which encompasses all ways by which the assembly 30 and the assembly 40 can communicate with one another, for the purpose of fulfilling the objects of the invention in solidification of radio-active waste or any other type of waste used in the device or by the method of the invention. This can involve simply dropping polymer onto a waste stream, so that selected amounts are brought together. It can involve the use of many different shapes and configurations of the two assemblies 30 and 40; and a number of means and positional orientations by which one can communicate with the other. The two assemblies 30 and 40 can also be constructed and fabricated of a number of different materials, and customized in construction to the types of waste which will be used in the device or processed under the method of the present invention. It will also be understood by those skilled in the art that a number of different types and shapes as to the container 18 can be utilized; and that a number of means can be employed for movement relative to the container 18 for proper positioning and deposit of the polymer and the waste as they leave the assemblies 30 and 40 in relation to the container 18 (general examples shown in FIGS. 17A-17G, 24).

Figure 23:
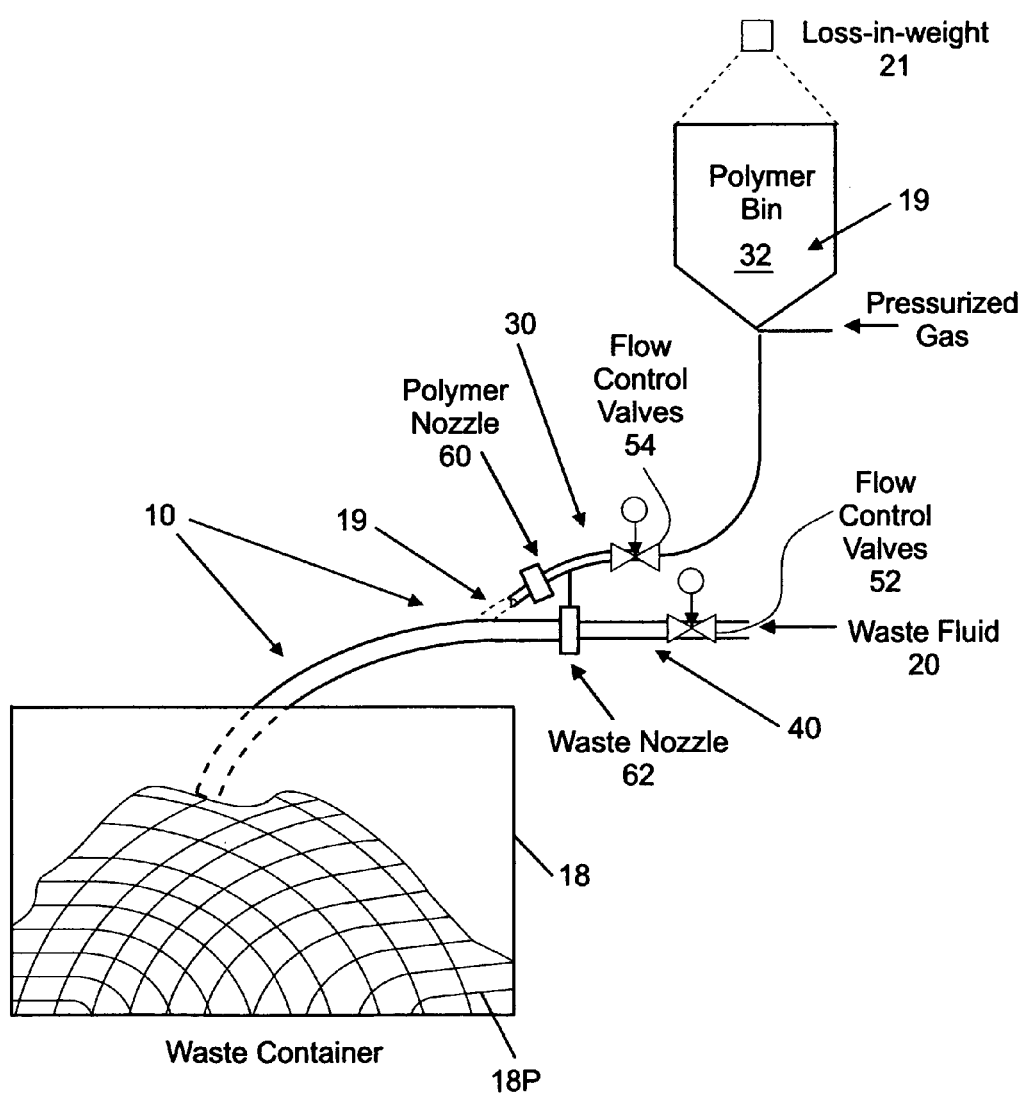
FIG. 23 is a side view of another embodiment of the present invention.

In this regard, each of the assemblies 30 and 40, in other preferred embodiments of the invention (Nozzle Embodiments), are provided, respectively with the polymer nozzle 60 and the waste nozzle 62; as shown by general example in FIGS. 23, 28 and 29. In this regard, this mechanism and method, as it is presented within the present invention, will be more advantageous in customized situation for processing waste; and as a means of mixing liquid waste and polymer. A shaped nozzle or nozzles 60 and/or 62) can be utilized to distribute the waste liquid in an even form. In preferred embodiments herein, the polymer is added using gravity or through injection using air or other gas as the propellant, to inject the polymer into the flowing stream. The same distribution principles and teachings, at least in significant part, of the trough 40 would apply to the flowing stream with respect to design of the polymer chute or injection nozzle. Also, the same relative cross-sectional area relationships would be maintained in the polymer delivery device as is found in the cross-sectional area of the waste stream at the point of intersection.

The preferred waste stream in these embodiments should be continuous and have an even thickness. This promotes, within the spirit of the invention, the rapid distribution of the polymer through the mass of liquid, and results in more polymerization of all the liquids. One assures, in the process of practicing the present invention, that the waste stream does not break into a spray with droplets such that some of the droplets might not be contacted or that some of the polymer would pass entirely through the spray without contacting a droplet.

Other advantages of the stream nozzle include that no clogging of the trough 40 would occur from early polymerization, or polymer sticking outside the normal flow channel. If the polymer supply assembly 30 is attached to the nozzle 60 both can be rotated in both horizontal and vertical directions, permitting more complete filling of a waste through better distribution in the waste container 18. Insertion of the nozzle 60, or nozzle assembly, into the hood 24 in other preferred embodiments, when dealing with special situations, may be preferred and of more simple construction and utilization than the entire waste trough assembly 40 (or a part thereof).

The volume aspects or conditions of the waste stream 20 are substantially controllable by factors, within the scope of the invention including, but no necessarily limited to: (1) Size of the orifice (with a larger orifice increasing the mass flow); (2) Feed pressure delivered to the orifice (with increase of feed pressure increasing the mass flow rate), (3) Use of flow strengtheners to increase the laminar flow and permit a more stable stream 20 to be formed upon which the polymer 19 can impinge (especially when a fan-stream is desired); and (4) Multiple orifices, when so required or needed in response to a particular job or use, when a wide fan stream is called for or desired.

In utilization of the device and method of the present invention, the angle of impingement of the polymer 19 will generally need, in many situations, to be nearly or substantially perpendicular or transverse to obtain the maximum penetration of the particles of the polymer 19. In these situations, generally, the velocity should not be great enough to penetrate the waste stream 20.

In these embodiments, as in the above described embodiments of the invention, the metering, waste flow control valve 52 and/or the polymer flow control valve 54; are used to preselectively, and/or periodically, control and meter the respective amounts of polymer 19 and waste 20 to be supplied to each of the nozzles used, 60 and/or 62.

Figure 12:
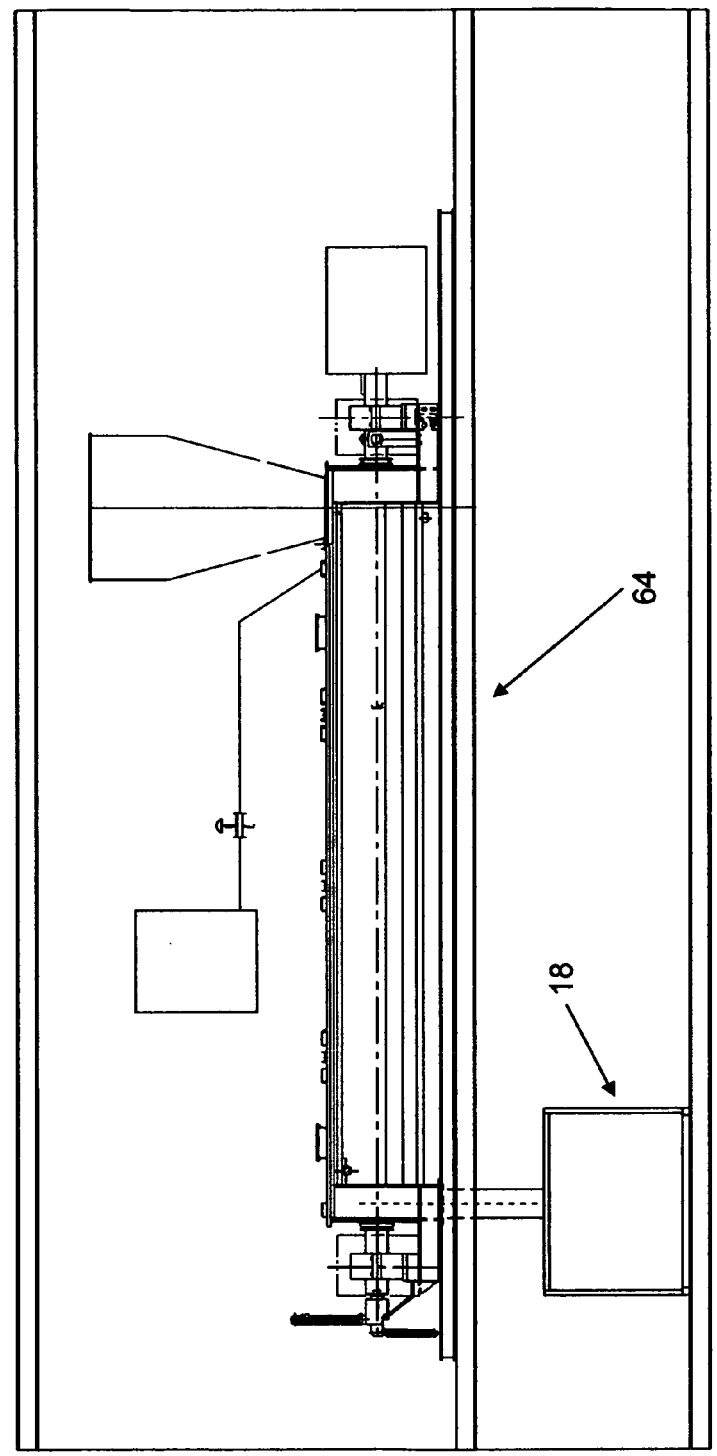
FIG. 12 is a side view of another different embodiment of the present invention

In additionally preferred embodiments of the invention, shown by general example in FIG. 12; the use of tumble, rotary, holo-flite, screw, plow, shear, paddle, or other types of vertical or horizontal mixers 64 facilitate the mixing of materials that are more viscous or which contain high amounts of solids on a batch by batch basis or continuous metered basis. This type of equipment, as used in the present invention, can also discharge dirt-like material. The equipment is also appropriate for sludge-like materials, as these types of materials cannot be put through a distribution header because openings may plug from particles causing improper distribution. On a batch basis, solidification agent 19 can be added until the proper consistency is reached for discharge without advance testing as to the required polymer of solidification agent loading. On a continuous basis, solidification agent can be metered as previously described herein.

Figure 13:
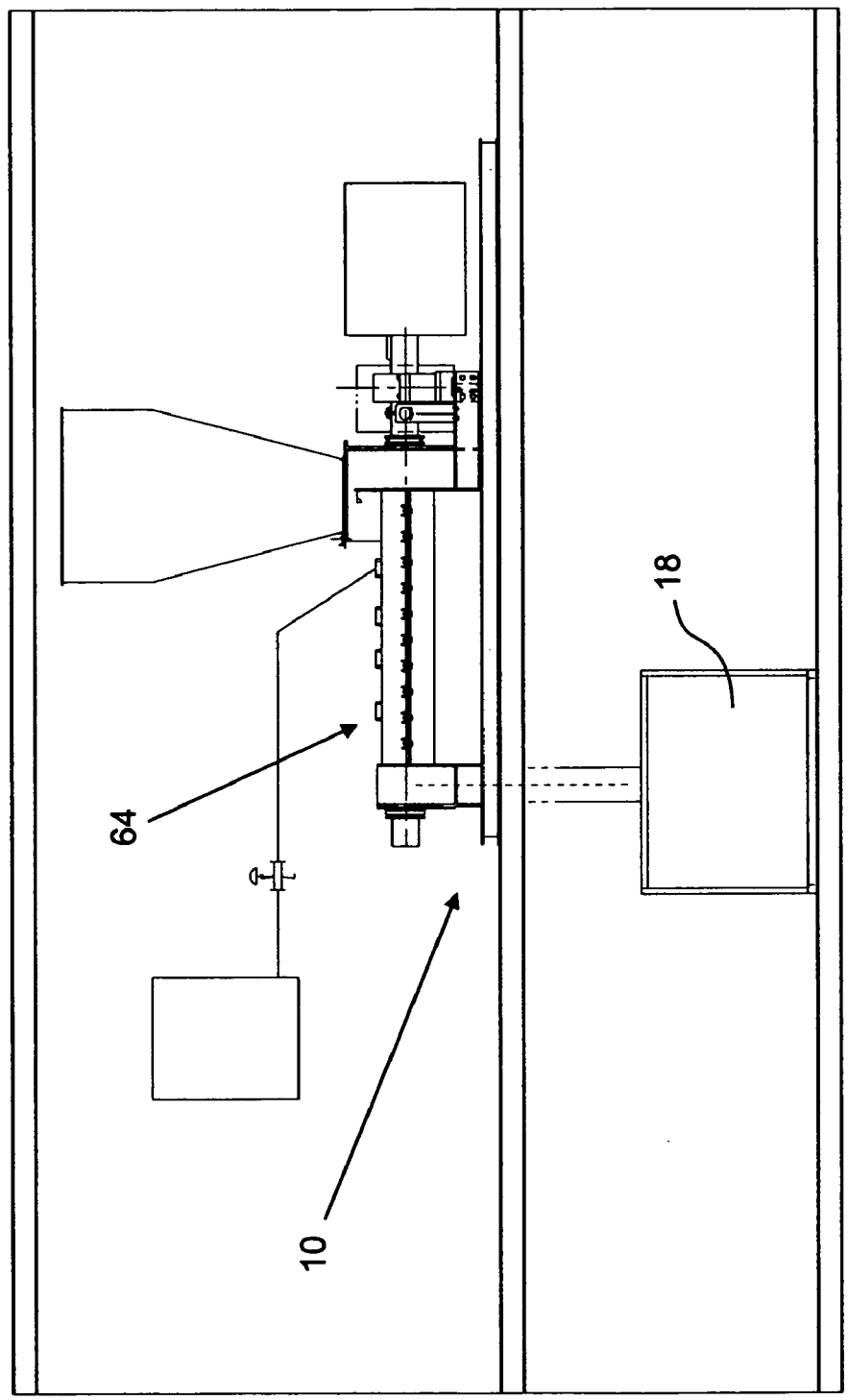
FIG. 13 is a side view of another different embodiment of the present invention.

In other related embodiments, illustrated by example in FIG. 13; the use of Readco-type equipment, or similar close tolerance, high shear mixers 64 is employed as an element within the method and device of the present invention, to thoroughly mix solids with the liquid stream under increasing viscosity conditions. These embodiments are particularly well suited to application in oil sorption; in that reactions involving these types of materials are often slower to occur and require more closely associated or contacted mixing. Readco-type mixers 64 are continuous mixers in nature that are, at least, somewhat self-cleaning-requiring little or no dismantlement for periodic cleaning. In most oases, as utilized in the invention, these types of mixers, or mixing units used particular for the purpose of the invention; could be flushed with the liquid or water a part of the process.

These types of embodiments are especially applicable to high viscosity liquids that may require more physical shear mixing to accelerate polymerization and provide more even distribution of the polymer or solidification agent employed within the invention. These preferred embodiments can also be applied to processing some sludges, where the maximum particle size is able to pass through the mixing unit.

Figure 14:
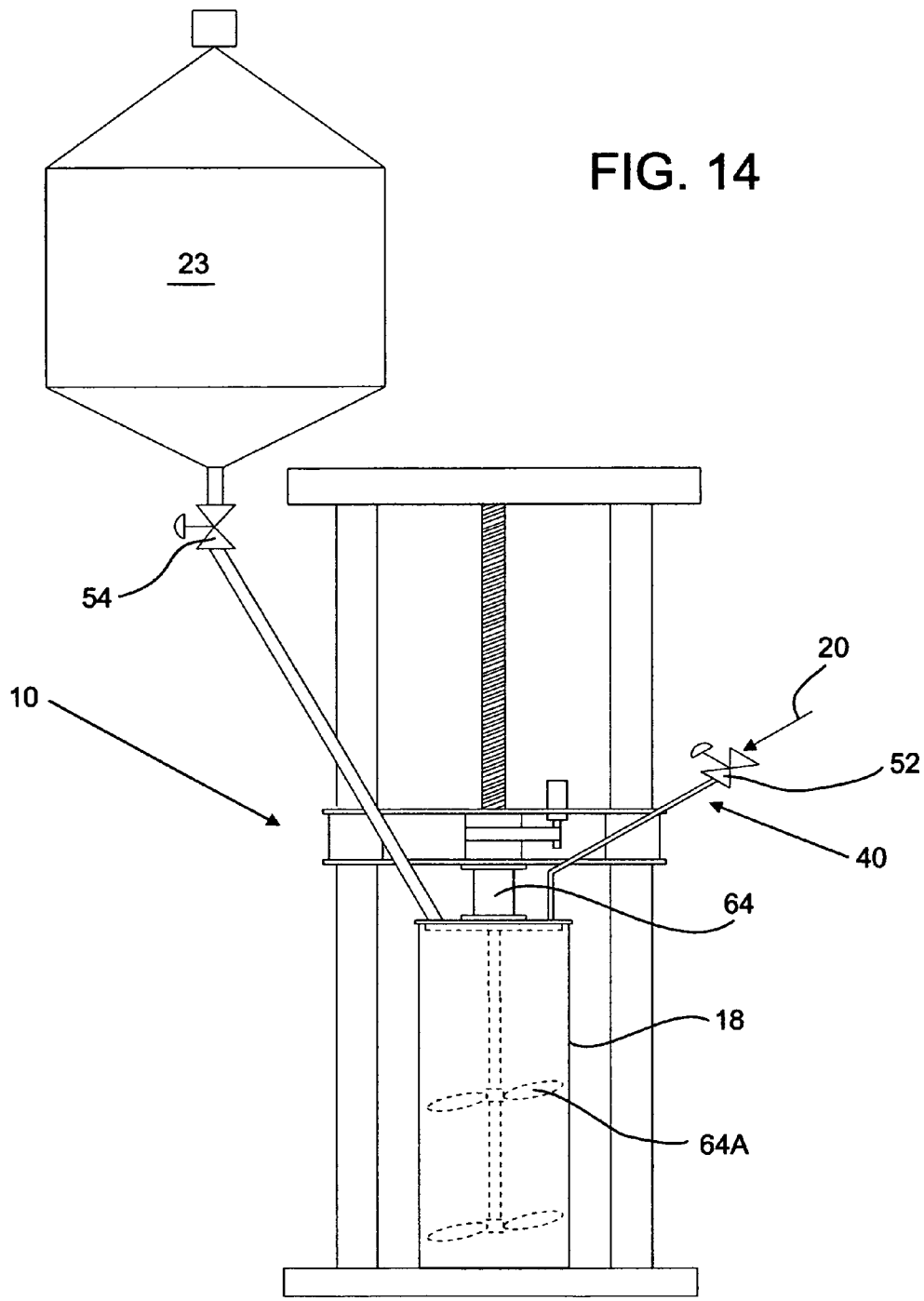
FIG. 14 is a side view, partially perspective in nature, illustrating another embodiment of the present invention.
Figure 15A:
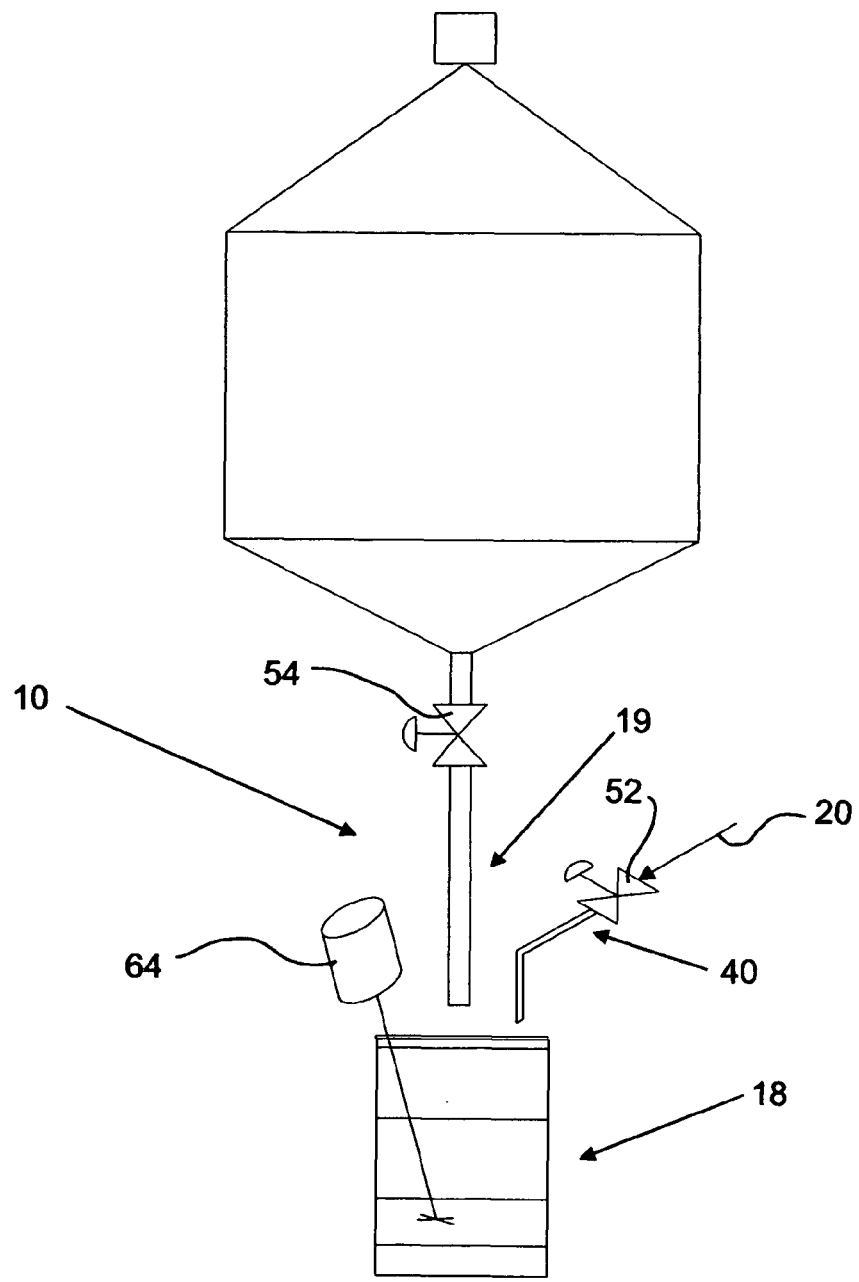
FIG. 15A is a side view, partially perspective in nature, illustrating an embodiment related to the that of FIG. 14.
Figure 16:
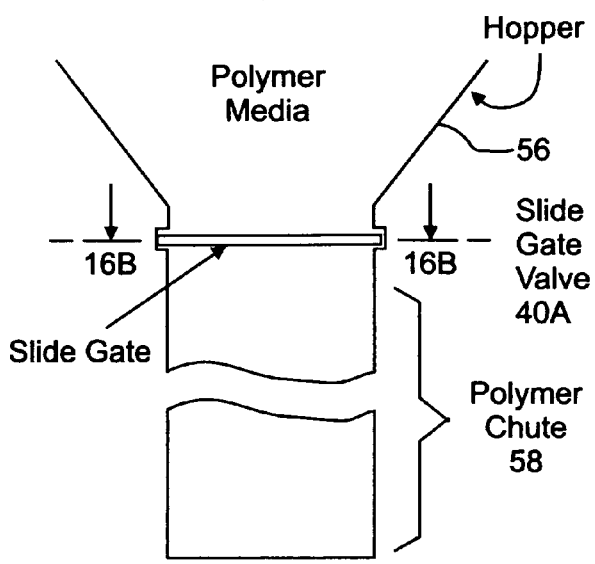
FIG. 16 is an embodiment of the polymer supply assembly related to the overall embodiment shown in FIG. 1A.
Figure 16A:
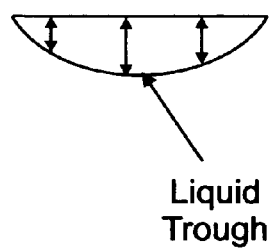
FIG. 16A is a cross-sectional view of an embodiment of the metered waste trough supply assembly of the present invention, related to the embodiment of FIG. 16.
Figure 16B:
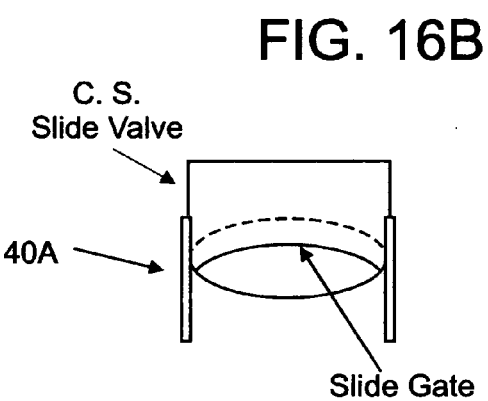
FIG. 16B is a cross-sectional view of the portion taken along line 16B-16B of FIG. 16.
Figure 16C:
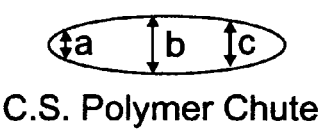
FIG. 16C is a exemplary, or representative cross-sectional view of the polymer chute of FIG. 16, designating portions important in preferred embodiments of the invention.
Figure 16D:
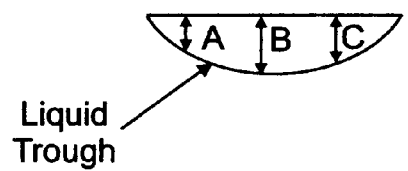
FIG. 16D is an exemplary, or representative, cross-sectional view of the waste liquid trough, also referred to herein as an embodiment of the metered waste trough supply assembly of the present invention.
Figure 17B:
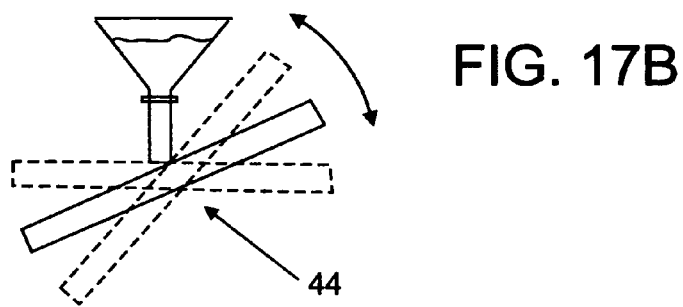
FIG. 17B is a representative or exemplary side view of the polymer and waste fluid supply assemblies of the invention, related to the embodiments of FIGS. 1A, 16 AND 17A.
Figure 17C:
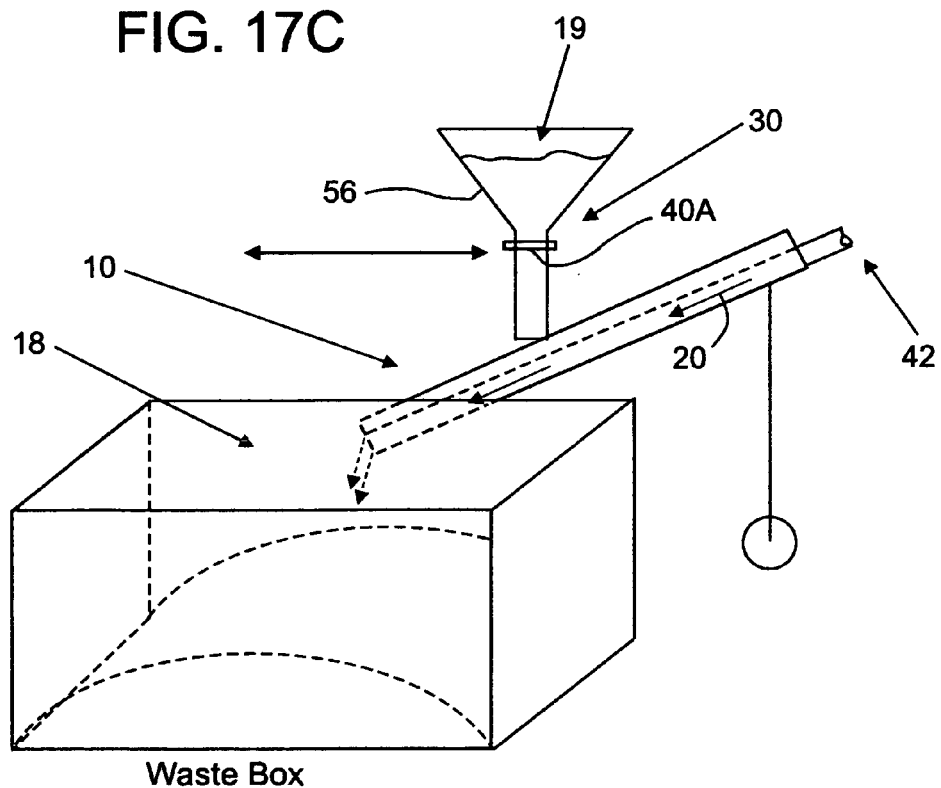
FIG. 17C is an exemplary side view of the embodiment of FIG. 17A, showing directional aspects of the movement of the solidification agent and the waste processed in the invention, and the positional aspects of the metered polymer supply assembly and the metered waste supply assembly in relation to the container of the invention.
Figure 21:
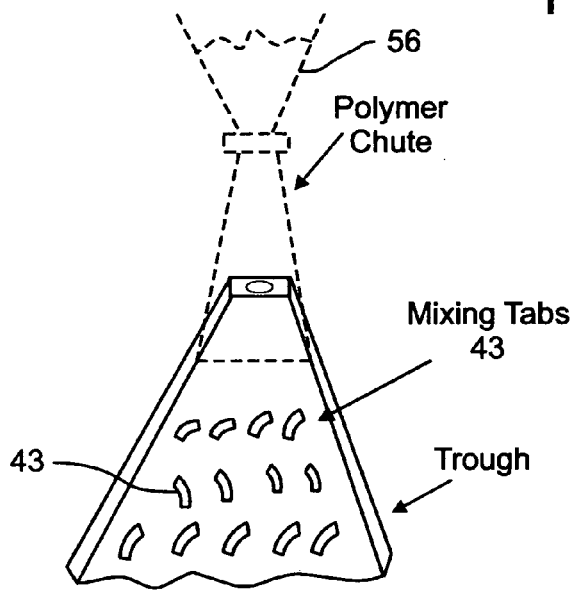
FIG. 21 is another perspective view of another embodiment of the trough and waste trough.
Figure 22:
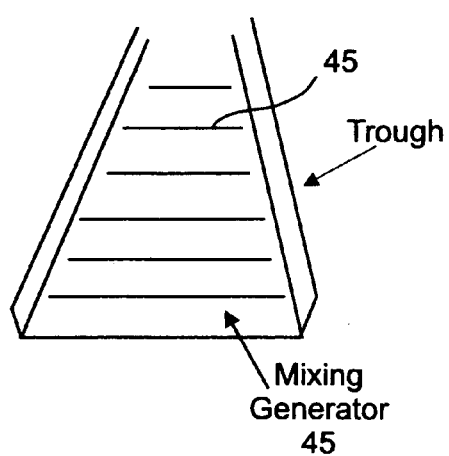
FIG. 22 is a partial perspective view of another embodiment of the trough and waste trough of the present invention.

In other preferred embodiments of the invention, shown by example generally at FIGS. 14, 15A and 15B; the use of high shear mixers is utilized to rapidly distribute the polymer or solidification agent 19 into the liquid waste 20 prior to gelation. As illustrated, the mixer 64 may either be in the container 18, or in the direct flow path of the fluid as it discharges into the container 18. As a part of these preferred embodiments, high, relatively high horsepower input is required to effect good distribution prior to gelation 47 such that the need is obviated for further mixing Examples of these embodiments are illustrated in the drawings, as previously referenced, regarding a propeller type mixer 64 in a container 18, constituted by a drum. In these embodiments the propeller 64A, as utilized, creates a deep vortex where the media can be introduced. Other containers 18 are utilizable where the volume is turned over every few seconds to few minutes based on the rate of gelation. The high shear mixer 64 is also utilizable in an inline fluid flow where the viscosity or reaction rates require a more vigorous mixing. Other aspects of these embodiments include utilization of a power disperser or jet type mixer 64 that combines the two streams as the flow through the mixing blade-device provided, into the container 18. The power dispenser or jet type mixer nozzle is also utilizable and is lowered into the container 18 when it is pre-filled with liquid and the solidification agent 19 added through the mixer.

The present invention is applicable to processing waste water that does not contain appreciable dissolved solids, but just a small quantity of particulate solids that contain substantial activity. For example, without limitation, the invention, in this respect, has a ready application to primary side ion exchange resin sluice water from PWR nuclear plants or facilities. The solids, in this regard, are primarily fine solids formed during sluicing of the resin. Within the scope of the present invention, the solidification agent 19 is pre-loaded into the container 18; the sluice water is pumped into the container 18 at a controlled rate; and this water is solidified prior to shipment. The container 18 is then transported to a radioactive materials handling facility for transfer as fill material into other debris boxes; or it can be shipped directly to an area for burial. Other applications of the invention would include the solidification of sludge from tanks, sumps and other sources. Other applications include neutralization of acid; and neutralization of caustic or other chemical spills, when it is more cost effective to remove and bury these materials than trying to treat them in the normal liquid radwaste system for environmental discharge.

In applicability to most all of the embodiments of the invention, there are times when the container 18 cannot be loaded at one time; or times when flow in the midst of the process has to be suspended for some reason. In such cases, the remainder of the container 18 can be loaded with waste 20 and/or solidification agent 19 and be solidified in layers or areas within the container 18 until the job is completed.

One of the many advantages of the present invention is its ability to accomplish safe solidification of the waste fluids that are processed through the device and method of the invention. This advantage is enhanced by the activation of the invention's device and method elements by remote control. Along with the many other improvements provided by the invention, the remote control aspects of the invention provide great improvement over the prior art's manual addition of polymer using manual sight of any solidification process being utilized, as the adjusting factor regarding how much polymer is added and mixed with a shovel or paddle.

In this regard, being able to control the addition of polymer through a loss-in-weight device, such as those described above herein and in relation to the scaling assembly 17, or other positive feeding mechanism, coupled to a flow meter for liquid measurement, makes the addition and metering of solidification agent and waste within the objectives and scope of the present invention, an available applied function that permits control of the functional elements and aspects of the invention to be on a remote basis. Remote control, as envisioned, without limitation, within the scope of the present invention, is preferably provided through a programmable logic controller (PLC), managed through a man-machine (man-computer) interface. Alternative remote monitoring devices in relation to those discussed with regard to the camera or other monitoring device 29, among many others employable; include CCTV or viewing with leaded window viewing port through a shielding wall. Some of the other instrumentation that aids, without limitation, within the scope and applications of the present invention, include: (1) Level sensors (ultrasonic, impedance, conductance, radio wave, photo beam, etc.); (2) Load cells; (3) Flow meters, flow totalizers; and (4) Flow switches. The use of remote means to activate, monitor and functionally actuate the elements of the invention's process and device embodiments is important because of the potential radiological dose exposures associated with nuclear wastewater processing.

Although the present invention has been described above in terms of exemplary preferred embodiments, it is anticipated that alterations and modifications thereof will no doubt become apparent to those skilled in the art.

Accordingly, the appended claims are intended to cover all changes, modifications and alternative options and embodiments, without limitation, falling within the true breath, scope and spirit of the present invention. The reader is, therefore, requested to determine the scope of the invention by the appended claims and their legal equivalents, and not by the examples which have been given.

We claim:

1. A method for mixing polymer and waste materials for solidification, comprising the steps of:
    positioning a polymer fluid within a container at, at least one preselected level during a cycle of time;
    deploying or installing at least one distribution manifold system, communicating with the supply of waste fluid and defining a plurality of openings, at a first position within said container proximate positionally to the at least one preselected level of polymer,
    supplying the waste materials through said openings for admixture and combination of the waste materials with at least a portion of the polymer fluid in said container.

2. The method of claim 1, further comprising the step of dimensioning the openings in the manifold in accordance with the waste materials to be supplied and the pressure under which the waste material is to be supplied.

3. The method of claim 2, wherein, the size and dimension of each of said openings is determined in accordance with the formula:

$$r = (w/K\pi(2g_c(p_1-p_2)\rho)^{0.5})^{0.5},$$

where:
    r = radius (ft.) of each of the openings,
    w = mass of waste per opening or mass flow rate per opening (lb/sec),
    K = constant ($K=C/1-\beta^4)^{0.5}$), and where K (for water) has a value of about 0.62 for Reynolds Numbers greater than (>) 1,000,
    β = diameter of the opening divided by the diameter of the at least one outlet arm member (ft),
    $g_c$ = gravitational constant (32.17 ft/sec$^2$),
    $p_1$ = pressure inside the manifold system (lbs/ft$^2$),
    $p_2$ = pressure outside the manifold system (lbs/ft$^2$),
    ρ = density of waste (lbs/ft$^3$), and
    C = coefficient of discharge based on Reynolds number (dimensionless) and is a function of β.

4. The method of claim 3, wherein, $p_1$ (the pressure inside the manifold system), to be utilized in said method, is determined, when the radius of each of the openings (r) and the mass flow rate (w) are known, in accordance with the formula:

$$p_1 = \{(w/K\pi r^2)^2/2g_c\rho\} - p_2.$$

5. The method of claims 2, wherein, the number of holes to be utilized, or required, in the at least one distribution manifold system is determined in accordance with the formulas:

$$w = Kr^2\pi(2g_c\rho(p_1-p_2))^{0.5} \text{ and}$$

$$N = W/w,$$

where:
    W = total flow rate (gpm or lb/sec), and
    N = the number of holes to be utilized, or required.

6. The method of claims 4, wherein, the number of holes to be utilized, or required, in the at least one distribution manifold system is determined in accordance with the formulas:

$$w = Kr^2\pi(2g_c\rho(p_1-p_2))^{0.5} \text{ and}$$

$$N = W/w,$$

where:
    W = total flow rate (gpm or lb/sec), and
    N = the number of holes to be utilized, or required.

7. The method of claim 1, wherein said method further comprises the step of positionally pivoting the at least one distribution manifold system from the first position to a second position within the container, contemporaneous with the addition of a further level of polymer fluid and supply of further waste materials through the openings of the manifold.

8. The method of claim 2, further comprising the step of blowing the openings clear with air or other pressurized or cleaning fluid at the completion of the waste fluid delivery by the at least one distribution manifold.

9. The method of claim 1, wherein additional levels of polymer fluid are added to the container.

10. The method of claim 1, wherein a plurality of manifold systems are deployed or installed in the container proximate to anticipated positions of respective polymer levels.

11. A method for mixing a polymer and a waste material to produce a solid product, polymerized and dirt-like in nature, for safe disposal; said method comprising the steps of meterably mixing and flowably positioning the polymer and the waste material in relation to a container.

12. The method of claim 11, further comprising the step of:
    metering a polymer volume and a waste fluid volume in relation to each other along an angled surface prior to their positioning in the container, such that the polymer volume makes contact and mixes with the waste fluid volume in a flowable and moving manner prior to the polymer volume and the waste fluid volume entering, and final solidifying within, the container.

13. The method of claim 12, wherein: the step of metering a polymer volume and a waste fluid volume in relation to each other, comprises supplying within a range of from about 1% to about 20% of polymer by weight.

14. The method of claim 12, wherein: the step of metering a polymer volume and a waste fluid volume in relation to each other, comprises supplying within a range of from about 2% to about 5% of polymer by weight.

15. The method of claim 12, wherein: the step of metering a polymer volume and a waste fluid volume in relation to each other, comprises supplying within a range of from about 2% to about 20% of polymer by volume.

16. The method of claim 12, wherein the polymer is chosen from a group consisting of poly(maleic anhydride), polyvinyl alcohol, poly (ethylene oxide), poly (hydroxymethylene), polyacrylamide, polyacrylate, starch-g-poly(acrylonitrile), ionic polysaccharides, and guar gum.

17. The method of claim 12, wherein: the angled surface being a trough member onto which the polymer volume and the waste fluid volume are supplied.

18. The method of claim 12, wherein: the angled surface having a triangularly surfaced area onto which the polymer volume and the waste fluid volume are supplied.

19. The method of claim 12, wherein: the angled surface having an arcuate surface onto which the polymer volume and the waste fluid volume are supplied.

20. The method of claim 12, wherein: the angled surface defining a channel therewithin.

21. The method of claim 17, further comprising the step while along the trough member of further directing and mixing the polymer volume and the waste fluid volume therewithin.

22. The method of claim 12, further comprising the step of forming a gelation on, and proximal to, the angled surface.

23. The method of claim 12, further comprising the step of supplying the polymer volume through a meterable flow control valve.

24. The method of claim 23, further comprising the step of supplying the waste fluid through a meterable flow control valve.

25. The method of claim 12, further comprising the step of supplying the polymer volume through a polymer nozzle.

26. The method of claim 25, further comprising the step of supplying the waste fluid through a waste nozzle.

27. The method of claim 12, further comprising: mechanical mixing of the polymer and the waste material prior to positioning in the container.

28. The method of claim 12, further comprising mixing the polymer and the waste material in the container.

29. The method of claim 28, wherein the mixing and flowably positioning further comprise placing a polymer or solidification agent into the container, and flowably passing an aqueous waste fluid through the container, to initiate polymerization and substantially complete solidification therewithin.

30. The method of claim 29, wherein the aqueous waste fluid comprises water and a small quantity of particulate solids.

31. The method of claim 30, wherein the aqueous waste fluid being a primary side ion exchange resin sluice water from a PWR nuclear plant.

32. The method of claim 28, further comprising: vortically mixing the polymer and the waste material in the container.

33. The method of claim 12, wherein prior to metering a polymer volume and a waste fluid volume, the step of supplying the angled surface dimensioned in accordance with the equation, $$L(\text{Max}) = t(\text{gel}) \times v/3,$$

where,
  $L(\text{Max})$ equals the length of the angled surface
  $t(\text{gel})$ equals time to gelation upon addition of polymer agent in seconds, and
  $v$ equals velocity of liquid in and on the angled surface, in ft/sec.

34. The method of claim 12, wherein, as a part of the metering step: supplying the polymer, through a means for catching and directing the polymer, in a downward flow toward the angled surface.

35. The method of claim 34 wherein:
  the angled surface being a waste trough through which the waste material is provided, and onto which the polymer is directed; and
  the means for catching and directing the polymer having a funneled portion and a polymer chute portion.

36. The method of claim 35, wherein as a part of the step of supplying the polymer, further including the step of passing the polymer through a metering valve.

37. The method of claim 36, wherein the metering valve is generally positioned between the funneled portion and the polymer chute portion.

38. The method of claim 37, wherein: the metering valve being a slide valve.

39. The method of claim 37, further comprising the step of cross-sectionally dimensioning the polymer chute portion in relation to the waste trough in accordance with the equation:

$$a/A \cong b/B \cong c/C,$$

where:
  "a" equals the first cross-sectional lateral dimensional magnitude of the polymer chute portion,
  "b" equals the center cross-sectional dimensional magnitude of the polymer chute portion, and
  "c" equals the second cross-sectional lateral dimensional magnitude, opposite and opposing the first cross-section lateral dimensional magnitude, of the polymer chute portion; and
  "A" equals the first cross-sectional lateral dimensional magnitude of the waste trough,
  "B" equals the center cross-sectional dimensional magnitude of the waste trough, and
  "C" equals the second cross-sectional lateral dimensional magnitude, opposite and opposing the first cross-section lateral dimensional magnitude of the waste trough.

* * * * *